US006336033B1

(12) United States Patent
Yamaguchi et al.

(10) Patent No.: US 6,336,033 B1
(45) Date of Patent: Jan. 1, 2002

(54) ADAPTIVE ARRAY ANTENNA

(75) Inventors: Ryo Yamaguchi; Yoshio Ebine, both of Yokohama (JP)

(73) Assignee: NTT Mobile Communication Network Inc., Tokyo (JP)

( * ) Notice: Subject to any disclaimer, the term of this patent is extended or adjusted under 35 U.S.C. 154(b) by 0 days.

(21) Appl. No.: 09/171,297

(22) PCT Filed: May 29, 1998

(86) PCT No.: PCT/JP98/02382

§ 371 Date: Oct. 16, 1998

§ 102(e) Date: Oct. 16, 1998

(87) PCT Pub. No.: WO98/56068

PCT Pub. Date: Dec. 10, 1998

(30) Foreign Application Priority Data

Feb. 6, 1997 (JP) ............................................ 9-144222

(51) Int. Cl.[7] .................................................. H04B 1/40

(52) U.S. Cl. ................. 455/273; 455/277.2; 455/279.1; 455/562

(58) Field of Search ........................... 455/277.1, 277.2, 455/272, 273, 278.1, 279.1, 131, 132, 133, 134, 135, 562; 342/374

(56) References Cited

U.S. PATENT DOCUMENTS

| | | | | |
|---|---|---|---|---|
| 4,338,605 A | | 7/1982 | Mims | |
| 5,345,246 A | | 9/1994 | Sezai | |
| 5,724,666 A | * | 3/1998 | Dent | 455/272 |

FOREIGN PATENT DOCUMENTS

| | | |
|---|---|---|
| DE | 693 14 412 | 2/1994 |
| EP | 0 583 110 | 2/1994 |
| JP | 58-90803 | 5/1983 |
| JP | 62-24702 | 2/1987 |
| JP | 4-5711 | 1/1992 |
| JP | 6-61737 | 3/1994 |
| JP | 6-132717 | 5/1994 |
| JP | 6-224628 | 8/1994 |
| JP | 7-058544 | 3/1995 |
| JP | 8-102618 | 4/1996 |
| JP | 8-154015 | 6/1996 |

OTHER PUBLICATIONS

Yamaguchi, Ryo, and Ebine, Yoshio, "Effect of Variable Directivity Base Station Antenna for Mobile Radio", *Technical Report of IEICE*, Institute of Electronics, Information and Communication Engineers, vol. 95, No. 538, Feb. 26, 1996, pp. 31–36.

* cited by examiner

*Primary Examiner*—Lester G. Kincaid
(74) *Attorney, Agent, or Firm*—Connolly Bove Lodge & Hutz LLP

(57) ABSTRACT

The outputs of antenna elements 11$_1$ to 11$_M$ of a wide directional pattern 12 are distributed by a distributor 13 to respective channel parts 14$_1$ to 14$_N$, and in each channel part 14*i* (i=1, 2, . . . , N), its connection points 31$_1$ to 31$_M$ to the distributor 14 are divided in groups of P=4; four connecting ends of the respective groups are connected via level-phase regulators 23$_1$to 23$_4$ to combiners 22$_1$ to 22$_L$ (L=M/P), then the combined outputs therefrom are applied to receivers 15$_1$ to 15$_L$, and the outputs therefrom are combined after being applied to regulators 16$_1$ to 16$_L$ which are adaptively controlled. In the channel part 14$_1$, coefficients $W_1$ to $W_4$ are set in regulators 23$_1$ to 23$_4$ to obtain a subarray directional pattern 24 and a combined directional pattern 19 is controlled within the range of the subarray directional pattern, and in another channel part coefficients $W_5$ to $W_8$ are set in the regulators 23$_1$ to 23$_4$ to obtain a subarray directional pattern 26; by setting the regulators 23$_1$ to 23$_4$ of each channel part, a wide area is covered as a whole.

30 Claims, 18 Drawing Sheets

$15_1$-$15_M$: RECEIVER $15_1$-$15_M$: RECEIVER $15_1$-$15_M$: RECEIVER $15_1$-$15_M$: RECEIVER $15_1$-$15_M$: RECEIVER

ADAPTIVE ARRAY ANTENNA

TECHNICAL FIELD

The present invention relates to an adaptive array antenna for use, for example, in base stations of mobile communications which has a plurality of antenna elements grouped into subarrays that fixedly define the control range of directivity.

PRIOR ART

FIG. 1 depicts the basic configuration of a conventional adaptive array antenna disclosed, for example, in Takeo Ohgane et al., "A Development of GMSK/TDMA System with CMA Adaptive Array for Land Mobile Communications," IEEE 1991, pp. 172–176. M antenna elements $\mathbf{11}_1$ to $\mathbf{11}_M$ are equally spaced, for example, by a distance d, and each have the same element directional pattern 12 of a large beam width, and they are connected to a high-frequency distributor 13; received signals via the antenna elements $\mathbf{11}_1$ to $\mathbf{11}_M$ are each distributed by the high-frequency distributor 13 to channel parts $\mathbf{14}_1$ to $\mathbf{14}_N$, that is, the received signal via each antenna element is distributed to N. The antenna element spacing d ranges from a fraction of to several times the wavelength used.

In each channel part $\mathbf{14}_i$ (i=1, 2, . . . , N) the received signals from the M antenna elements distributed thereto are applied to M receivers $\mathbf{15}_1$ to $\mathbf{15}_M$, respectively. Baseband signals from the receivers $\mathbf{15}_1$ to $\mathbf{15}_M$ are provided via level-phase regulators $\mathbf{16}_1$ to $\mathbf{16}_M$ to a baseband combiner 17, wherein they are combined into a received output; the output is branched to an adaptive signal processing part 18, then the level-phase regulators $\mathbf{16}_1$ to $\mathbf{16}_M$ are regulated to minimize an error of the received baseband signal, whereby the combined directional pattern 19 of the antenna elements $\mathbf{11}_1$ to $\mathbf{11}_M$ is adaptively controlled as shown, for example, in FIG. 1 so that the antenna gain decreases in the directions of interfering signals but increases in the direction of a desired signal. This allows the base station to perform good communications with N mobile stations over N channels. An increase in the number M of antenna elements increases the gain and enhances the interference eliminating performance. At the same time, however, the number of receivers 15 also increases and the amount of signal processing markedly increases.

With a view to solving the abovementioned problems, there is proposed in Japanese Patent Application Laid-Open No. 24702/87 an adaptive array antenna of such a configuration as depicted in FIG. 2 wherein the array antenna elements are divided into groups (subarrays) each consisting of several antenna elements, the high-frequency received signals are controlled in phase and level and then combined for each subarray and the combined signals are each distributed to the N channels. In the illustrated example, subarrays $\mathbf{21}_1$ to $\mathbf{21}_L$ are formed in groups of four antenna elements, and for each subarray, the received signals are combined by one of high-frequency signal combiners $\mathbf{22}_1$ to $\mathbf{22}_L$. Each subarray has high-frequency level-phase regulators $\mathbf{23}_1$ to $\mathbf{23}_4$ connected to the outputs of the antenna elements, in which coefficients $W_1$ to $W_4$ are set to regulate the levels and phases of the received signals so that the subarrays $\mathbf{21}_1$ to $\mathbf{21}_L$ have the same antenna directional pattern 24. The outputs of the high-frequency signal combiners $\mathbf{22}_1$ to $\mathbf{22}_L$ are fed to the high-frequency distributor 13, from which they are distributed to the channels $\mathbf{14}_1$ to $\mathbf{14}_N$. The subsequent processing is he same as in the case of FIG. 1.

In this instance, the number of receivers $\mathbf{15}_1$ to $\mathbf{15}_L$ in each channel part $\mathbf{14}_i$ is reduced to L, in this example, M/4, and the number of level-phase regulators $\mathbf{16}_1$ to $\mathbf{16}_L$ is also reduced to M/4, that is, the amount of hardware used is reduced; besides, the gain of the overall directivity (combined directivity) of the antenna elements $\mathbf{11}_1$ to $\mathbf{11}_M$ increases and interfering signal components are also removed sufficiently. However, the range over which the combined directivity can be controlled is limited only to the range of the subarray directional pattern 24, and hence it cannot be controlled over a wide range. That is, when the direction of the subarray directional pattern is changed as indicated by the dashed line 26 in FIG. 2, for example, by setting coefficients $W_5'$ to $W_8'$ in the level-phase regulators $\mathbf{23}_1$ to $\mathbf{23}_4$, respectively, the range over which the combined directional pattern 19 can be regulated by the level-phase regulators $\mathbf{16}_1$ to $\mathbf{16}_L$ is limited specifically to the range of this directional pattern 26. The range over which to track mobile stations is thus limited, but a wide angular range could be covered by such an antenna arrangement as depicted in FIG. 3. That is, a plurality of array antennas $\mathbf{27}_1$ to $\mathbf{27}_5$, each consisting of the subarrays of antenna elements in groups of M shown in FIG. 2, are installed with the subarray directional patterns of the array antennas $\mathbf{27}_1$ to $\mathbf{27}_5$ sequentially displaced a proper angle apart as indicated by beams $\mathbf{24}_1$ to $\mathbf{24}_5$ and the array antennas $\mathbf{27}_1$ to $\mathbf{27}_5$ are selectively switched to track mobile stations in any directions over such a wide range as indicated by the beams $\mathbf{24}_1$ to $\mathbf{24}_5$; by this, a wide service area could by achieved. From the practical point of view, however, it is difficult to install such a large number of antenna elements as mentioned above.

A possible solution to this problem is to decrease the number M of antenna elements used and hence enlarge the antenna spacing d. In this instance, as depicted in FIG. 2, when the width of the element directional pattern 12 is large, narrow grating lobes 28 of relatively large gains, other than the main beam 19, develop in plural directions at about the same angular intervals. In the directions of the grating lobes 28, however, the BER (Bit Error Rate) due to interfering signal components increases, making it difficult to use the antenna. On the other hand, when the directional pattern 12 is narrow as indicated by a brokenline 24 in FIG. 5, no grating lobes appear as shown in FIG. 5, but the range over which to control the combined directivity 19 is limited by the element directivity 24 and a wide range cannot be covered accordingly.

An object of the present invention is to provide an adaptive array antenna with which it is possible to offer services over a wide range without involving marked increases in the numbers of receivers and processing circuits and in the computational complexity.

DISCLOSURE OF THE INVENTION

The adaptive array antenna according to the present invention comprises:

- a plurality of subarrays of antenna elements arranged in groups of at least two, said antenna elements each outputting a high-frequency received signal;
- a plurality of high-frequency level-phase regulators for regulating the levels and phases of said high-frequency received signals from said at least two antenna elements of each of said plurality of subarrays, thereby setting the directivity of said each subarray;
- a high-frequency signal combiner for combining the regulated high-frequency received signals from said plurality of high-frequency level-phase regulators corresponding to said each subarray and for outputting the combined high-frequency signal;

a receiver for converting said combined high-frequency signal from said high-frequency signal combiner corresponding to said each subarray to a baseband signal and for outputting said baseband signal;

a baseband level-phase regulator for adaptively regulating the level and phase of said baseband signal from said receiver corresponding to said each subarray;

a baseband signal combiner for combining the regulated baseband signals from said baseband level-phase regulators corresponding to said plurality of subarrays, respectively, and for outputting the combined baseband signal; and an adaptive signal processing part whereby said baseband level-phase regulators corresponding to said plurality of subarrays, respectively, are adaptively controlled based on said combined baseband signal from said baseband signal combiner to set the combined directivity of all the antenna elements in the direction of a desired signal.

BEST MODE FOR CARRYING OUT THE INVENTION

Figure 1:
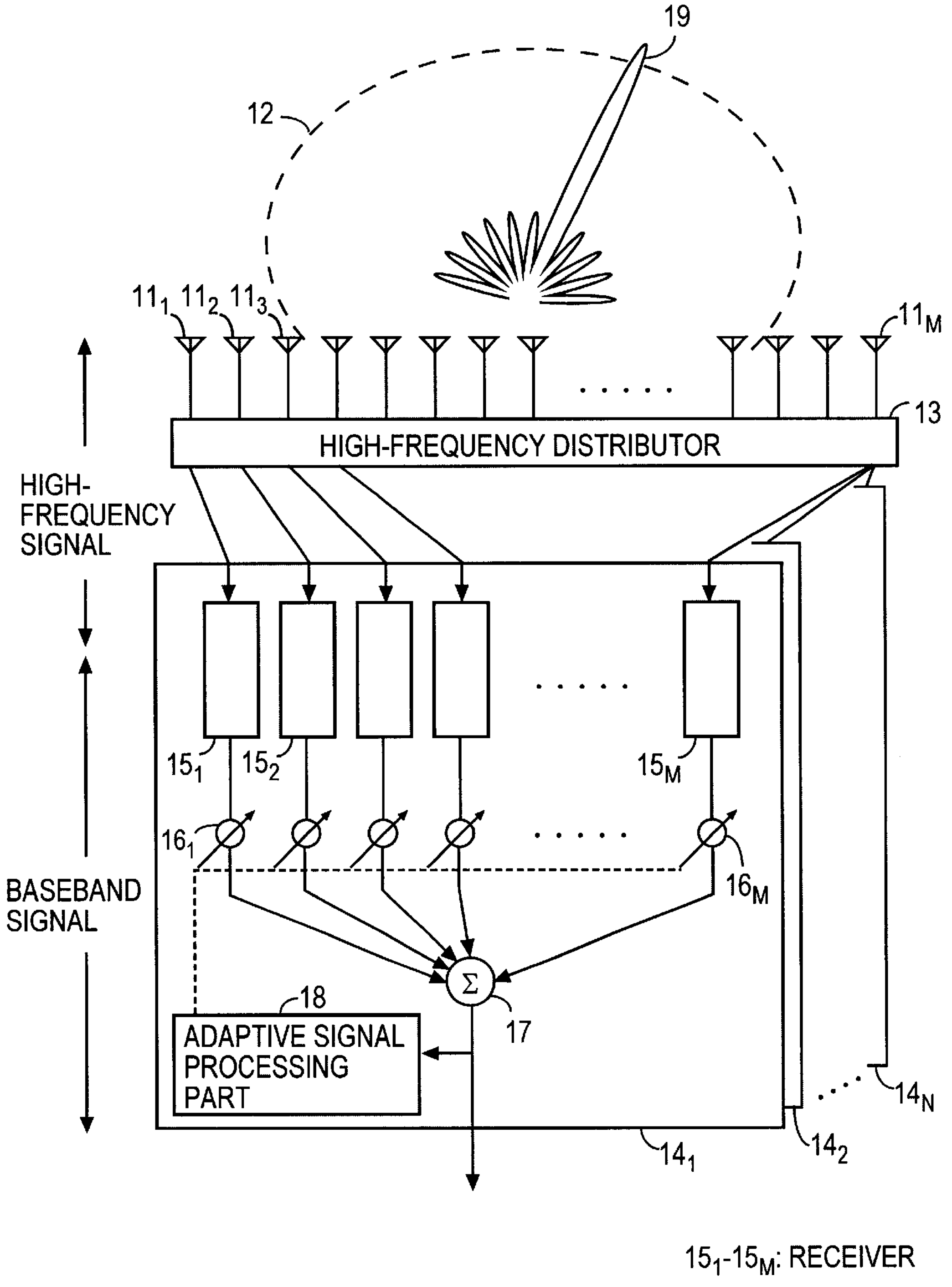
FIG. 1 PRIOR ART
FIG. 1 is a diagram depicting a conventional adaptive array antenna.
Figure 2:
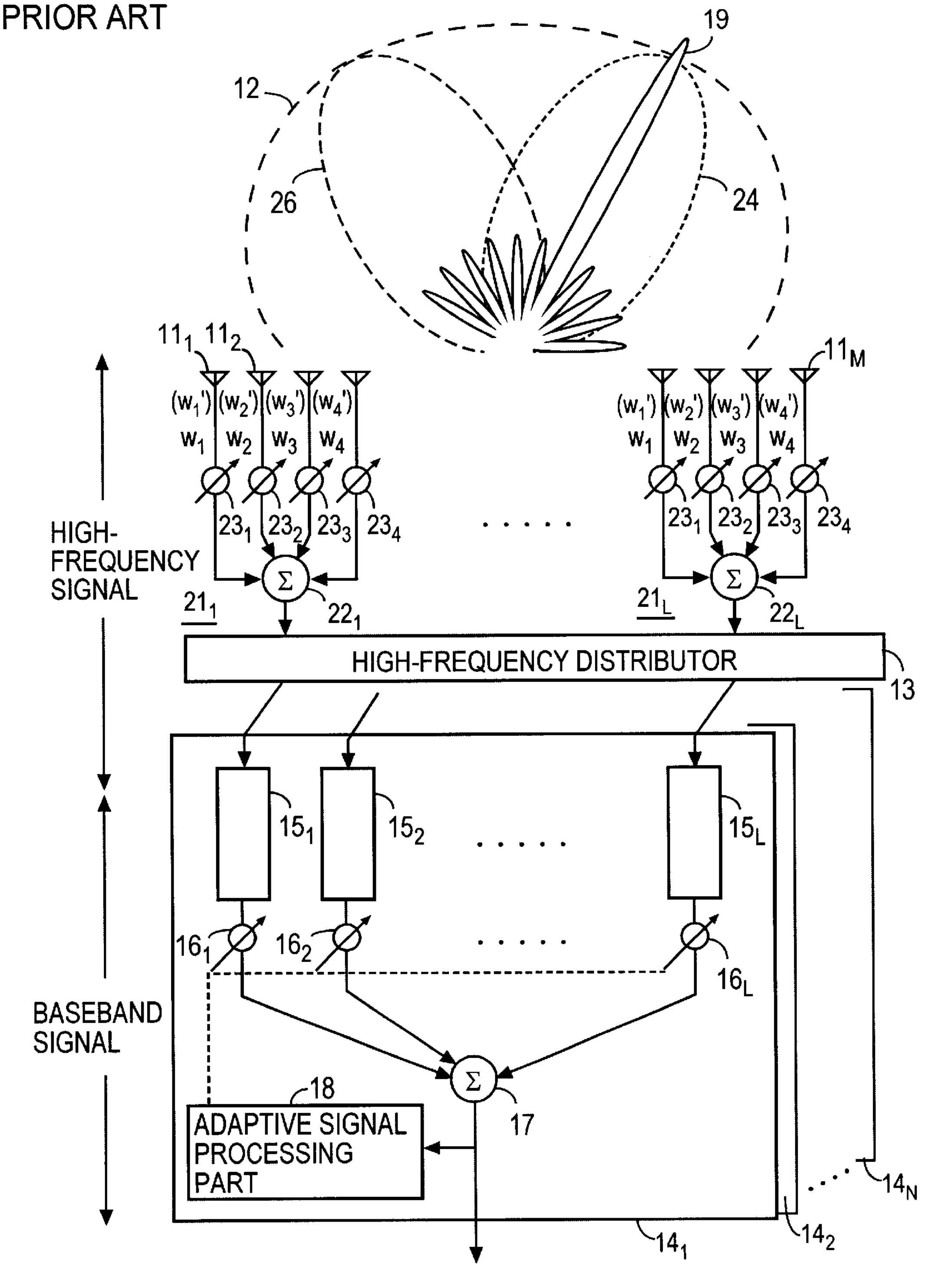
FIG. 2 PRIOR ART
FIG. 2 is a diagram depicting a conventional subarrayed adaptive array antenna with subarrays.
Figure 3:
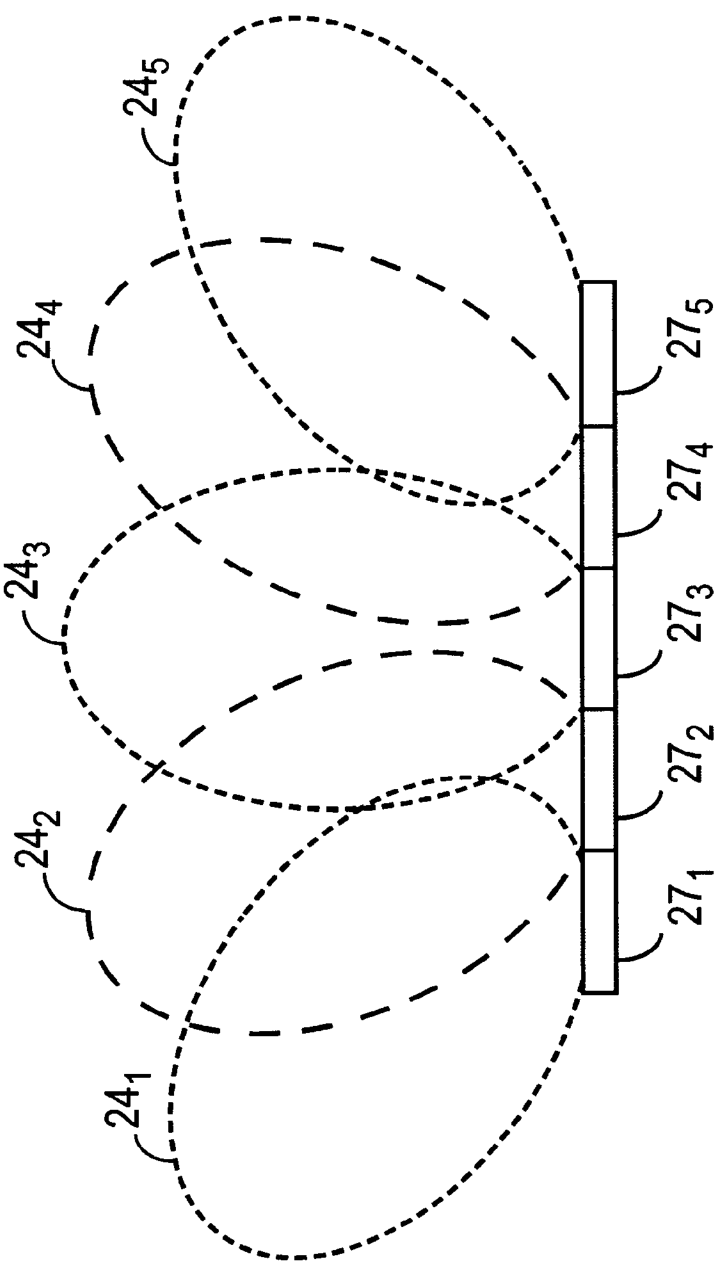
FIG. 3 PRIOR ART
FIG. 3 is a diagram depicting a conventional subarrayed adaptive array antenna with an enlarged service area.
Figure 6:
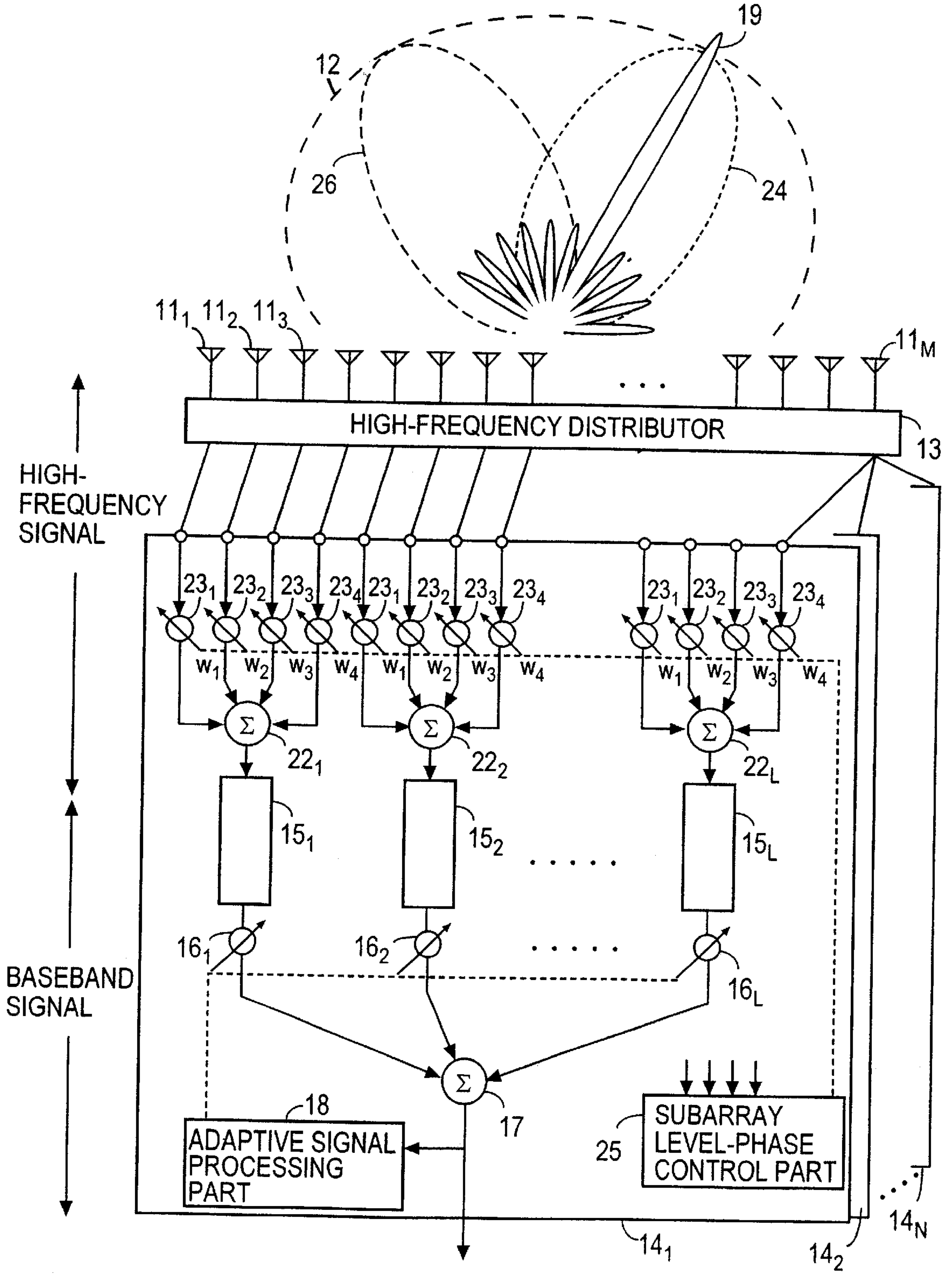
FIG. 6 is a diagram illustrating an embodiment of the present invention.

In FIG. 6 there is illustrated an example of the present invention applied to a receiving antenna, in which the parts corresponding to those in FIGS. 2 and 3 are identified by the same reference numerals. In this embodiment the outputs from the M antenna elements $\mathbf{11}_1$ to $\mathbf{11}_M$ are each distributed by the high-frequency distributor 13 to the N channels, and the M outputs thus distributed by the high-frequency distributor 13 are input into each channel part $\mathbf{14}_i$ (i=1, . . . , N). The number M of antenna elements actually used ranges, for example, from 8 to 32. In the present invention the antenna elements $\mathbf{11}_1$ to $\mathbf{11}_M$ are divided into L=M/P (where P is an integer equal to or greater than 2) groups (subarrays) each consisting of P, in this example, four antenna elements; for each subarray, the high-frequency level-phase regulators $\mathbf{23}_1$ to $\mathbf{23}_4$ are connected to the outputs of the high-frequency distributor 13 corresponding to the high-frequency received signals from the P antenna elements, respectively, and the output high-frequency received signals from the high-frequency level-phase regulators $\mathbf{23}_1$ to $\mathbf{23}_4$ are applied to a high-frequency signal combiner $\mathbf{22}_j$ (j=1, 2, . . . , L). That is, the high-frequency received signals from the P antenna elements are combined by the high-frequency signal combiner $\mathbf{22}_j$, and then the combined signal is fed to the corresponding receiver $\mathbf{15}_j$. The number P of antenna elements forming each subarrays is two to eight, for instance.

The antenna elements $\mathbf{11}_1$ to $\mathbf{11}_M$ are equally spaced by d on a straight line or circular arc, and consequently, the outermost antenna elements of adjacent subarrays are spaced the distance d apart. That is, the center-to-center spacing between adjacent subarrays is larger than the width (3d in this example) of each subarray by d. The width of each subarray is 3d. The directional pattern 12 of each of the antenna elements $\mathbf{11}_1$ to $\mathbf{11}_M$ arranged at regular intervals d is wide enough to cover the intended service area, and the coefficient values $W_1$ to $W_4$ are set in the high-frequency level-phase regulators $\mathbf{23}_1$ to $\mathbf{23}_4$ corresponding to each subarray of the channel part, for example, $\mathbf{14}_1$. Each coefficient value W is a complex signal containing information about amplitude and phase, and is determined by a high-frequency level-phase control part 25, for example, on the basis of received power from each antenna element of any one of the subarray so that the direction of the peak of the subarray directional pattern coincides with the direction of a desired signal. By this, as depicted in FIG. 6, the directional pattern 24 of each subarray antenna can be made substantially the same as the subarray directional pattern 24 shown, for example, in FIG. 2. The combined directional pattern 19 available in the channel part $\mathbf{14}_1$ is controlled within the range of the subarray directional pattern 24 by regulating the levels and phases of output baseband signals of the receivers $\mathbf{15}_1$ to $\mathbf{15}_L$ in the baseband level-phase regulators $\mathbf{16}_1$ to $\mathbf{16}_L$ through the use of baseband coefficients $Z_1$ to $Z_L$ generated by and fed thereto from the adaptive signal processing part 18. The baseband coefficients $Z_1$ to $Z_L$ are complex signals that have amplitude and phase information.

Figure 4:
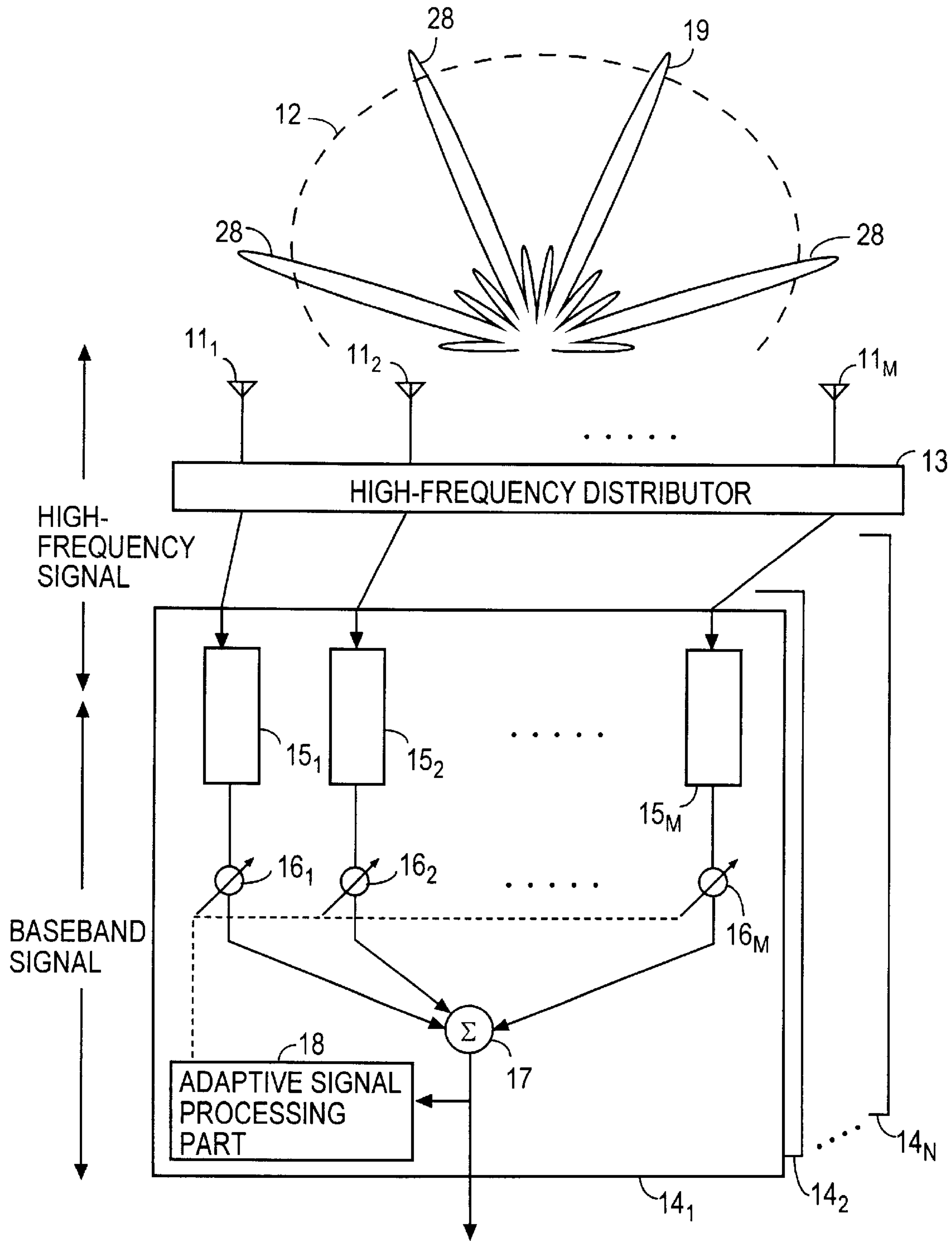
FIG. 4 is a diagram showing an adaptive array antenna with enlarged spacing between antenna elements of a wide element directional pattern.
Figure 5:
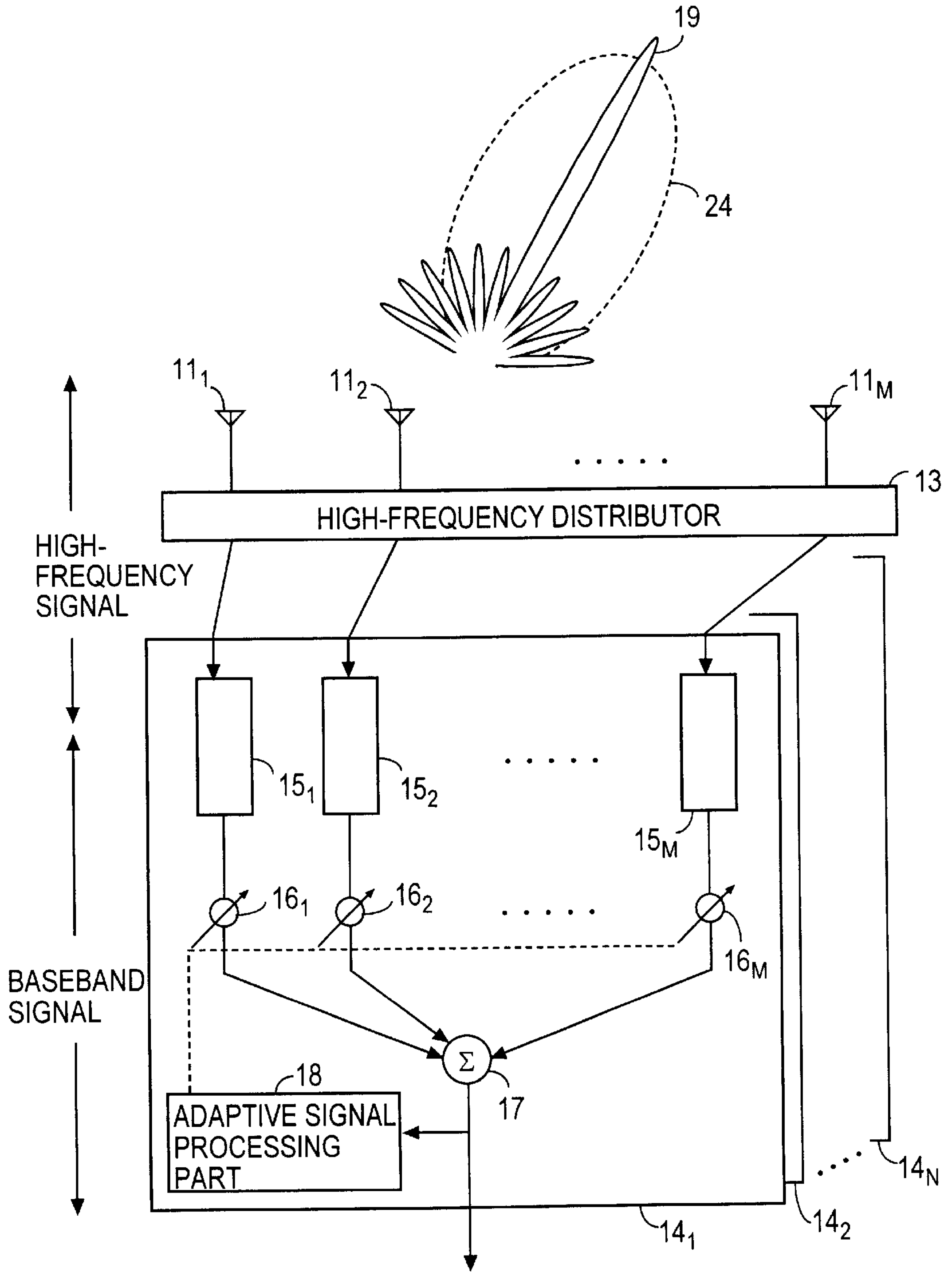
FIG. 5 is a diagram showing an adaptive array antenna with enlarged spacing between antenna elements of a narrow element directional pattern.

On the other hand, though not shown, coefficient values $W_1'$ to $W_4'$ are set, for example, in the high-frequency level-phase regulators $\mathbf{23}_1$ to $\mathbf{23}_4$ of the channel part $\mathbf{14}_2$, and the directional pattern of each subarray can be provided in a direction different from that of the abovementioned subarray directional pattern 24 as indicated by the chained line 26. Similarly, the high-frequency level-phase regulators $\mathbf{23}_1$ to $\mathbf{23}_4$ of each channel part are set so that one of the subarray directional patterns $\mathbf{24}_1$ to $\mathbf{24}_5$ depicted, for example, in FIG. 4 is formed by any one of the channel parts $\mathbf{14}_1$ to $\mathbf{14}_N$, that is, so that the directional patterns $\mathbf{24}_1$ to $\mathbf{24}_5$ are all covered by any one of the channel parts $\mathbf{14}_1$ to $\mathbf{14}_N$.

Thus, the number of antenna elements for providing the five kinds of directional patterns shown in FIG. 3 can be reduced down to, in this example, one-fifth the number of antenna elements needed in the prior art, while at the same time the wide service area depicted in FIG. 3 can be achieved.

Figure 7:
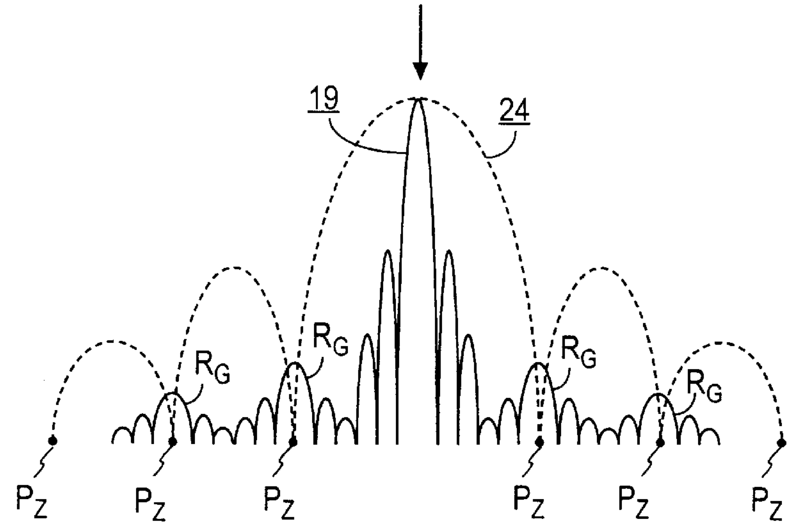
FIG. 7 is a conceptual diagram showing the relationship between a directional pattern of a subarray and a combined directional pattern of the array antenna in its entirety in the FIG. 6 embodiment.

FIG. 7 conceptually shows the relationship between the subarray directivity and the combined directivity of the whole array antenna as indicated by the broken line 24 and the solid line 19, respectively. The abscissa represents azimuth angle and the ordinate receiving sensitivity (receiving level). The subarray directional pattern 24 is composed of a wide main lobe with the maximum peak, and in this example, four side lobes adjacent thereto at both sides thereof, each of which is about half the width of the main lobe and has a lower peak. The points of contiguity, $P_Z$, of the respective lobes of the subarray directional pattern, where the receiving level is zero, will hereinafter be referred to as zero points. The combined directional pattern 19 consists of: a set of beam-shaped lobes, five in all, which lie in the main lobe of the subarray directional pattern, i.e. a narrow beam-shaped lobe having its maximum peak in the same direction as that of the abovementioned main lobe, and in this example, two beam-shaped side lobes which develop at either side of the narrow beam-shaped lobe with their peaks spaced at a fixed distance apart and are about half as wide as the lobe and have lower peaks; and pluralities of similar sets of five beam-shaped lobes of about the same width which develop like echoes at both sides of the above-mentioned quintet of lobes and have lower peaks. The central one of the beam-shaped lobes of each second-mentioned sets has a higher peak than the lobes adjacent thereto (beam-shaped side lobes) and about twice wider than them. Accordingly, the beam-shaped lobes of the maximum peaks in the respective sets are spaced at equal angles on each side of the beam-shaped lobe of the maximum peak of the combined directional pattern 19, and they are commonly referred to as grating lobes.

In the example of FIG. 7 the direction of the maximum peak of the combined directional pattern of the whole array antenna and the direction of the maximum peak (hereinafter referred to simply as the direction of the peak) of the subarray directional pattern are the same, that is, they are at the same angular position on the abscissa; since the grating lobes $R_Z$ are at the zero points $P_Z$ of the subarray directional pattern, they are suppressed and reception is hardly affected by interfering signal components.

In mobile communication systems, as a mobile station moves, the base station repeats, at relatively long time intervals (of several to tens of seconds, for instance), a corrective action for the peak of the subarray directional pattern to roughly track the mobile station. Alternatively, in the case where the subarray directional pattern covers the angular range of one sector (one of service areas into which the cell is divided about the base station at equiangular intervals of, for example, 60 degrees), the subarray directional pattern is fixedly set in accordance with the angular range of the sector. Such setting of the subarray directional pattern is controlled by the coefficients $W_1$ to $W_4$ which are set in the high-frequency level-phase regulators $\mathbf{23}_1$ to $\mathbf{23}_4$ from the subarray level-phase control part 25.

Figure 8:
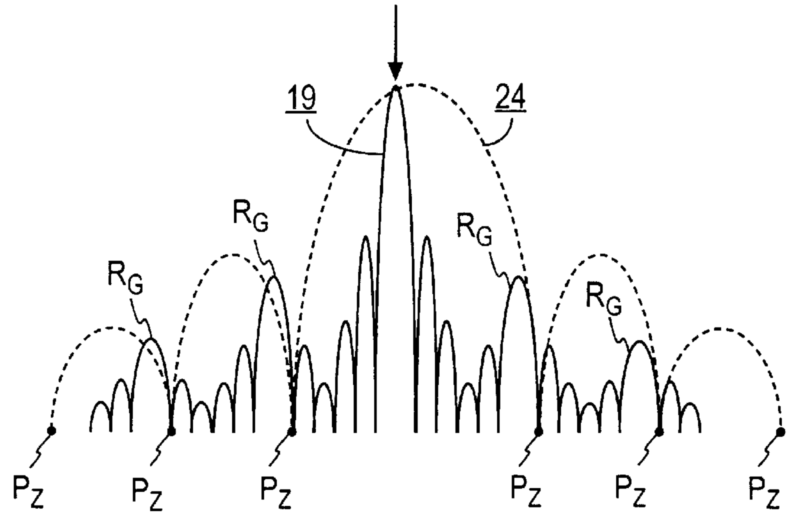
FIG. 8 is a conceptual diagram showing the relationship between the subarray directional pattern and the combined directional pattern of the whole array antenna in the event that their peaks are displaced apart in direction in the FIG. 6 embodiment.

On the other hand, as the mobile station moves, the base station adaptively controls the levels and phases of the received baseband signals by the baseband level-phase regulators $\mathbf{16}_1$ to $\mathbf{16}_L$ to make the peak of the combined directional pattern of the whole array antenna track the mobile station at all times. Accordingly, when the peak of the combined directional pattern of the whole array antenna is made to track the mobile station while the subarray directional pattern is held unchanged, the direction of the peak of the combined directional pattern shifts, in this example, to the left from the direction of the peak of the main lobe of the subarray directional pattern as depicted in FIG. 8. When the direction of the peak shifts as mentioned above, the combined directional pattern shifts to the left as a whole with respect to the subarray directional pattern as shown in FIG. 8, with the result that the grating lobes $R_G$ shift to the left from the zero points $P_Z$ and enter the lobes of the subarray directional pattern. In consequence, the grating lobes $R_G$ become large and the BER performance is degraded under the influence of interfering signal components in the directions of the grating lobes.

As described above, in the subarrayed adaptive array antenna, when the direction of the peak of the combined directivity deviates from the direction of the peak of the subarray directional pattern, the grating lobes $R_G$ enter the lobes of the subarray directional pattern, and consequently, the deviation directly affects the interference characteristic. In the event that such a deviation in the direction of the peak is unavoidable, one possible method for reducing the influence of grating lobes is to make the grating lobes lower by suppressing the subarray side lobes. Then, one possible method for preventing the grating lobes from generation in the side lobes is to make smaller than 1 the power combining ratio of both outermost ones of the plural (three or more) antenna elements of each subarray to the inner antenna elements in the FIG. 6 embodiment.

Figure 9:
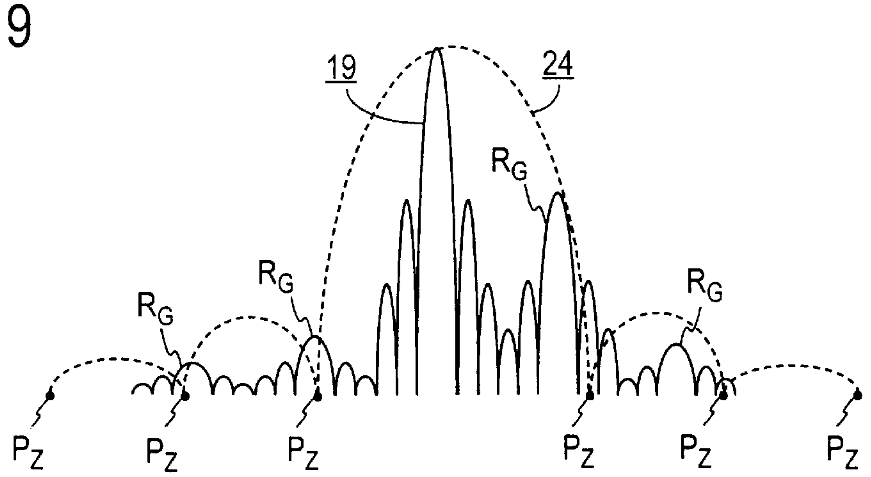
FIG. 9 is a conceptual diagram showing the relationship between the subarray directional pattern and the combined directional pattern in the case where side lobes of the subarray are suppressed in FIG. 8.

FIG. 9 conceptually shows the subarray directional pattern 24 and the combined directional pattern 19 of the whole array antenna in the case where the power combining ratio of high-frequency received signals from the both outermost antenna elements of the subarray to high-frequency received signals from the inner antenna elements is selected low, for example, 0.5. As depicted in FIG. 9, by suppressing the side lobes of the subarray directional pattern low, the grating lobes $R_G$ in those side lobes are suppressed low. To is perform this, for example, in the FIG. 6 embodiment, when the outputs of the four high-frequency level-phase regulators $\mathbf{23}_1$ to $\mathbf{23}_4$ are combined by each of the high-frequency signal combiners $\mathbf{22}_1$ to $\mathbf{22}_L$ corresponding to the respective subarrays, the power combining ratio between the two outer ones of the four antenna elements and the two inner ones is set to 0.5:1, for instance.

Figure 10:
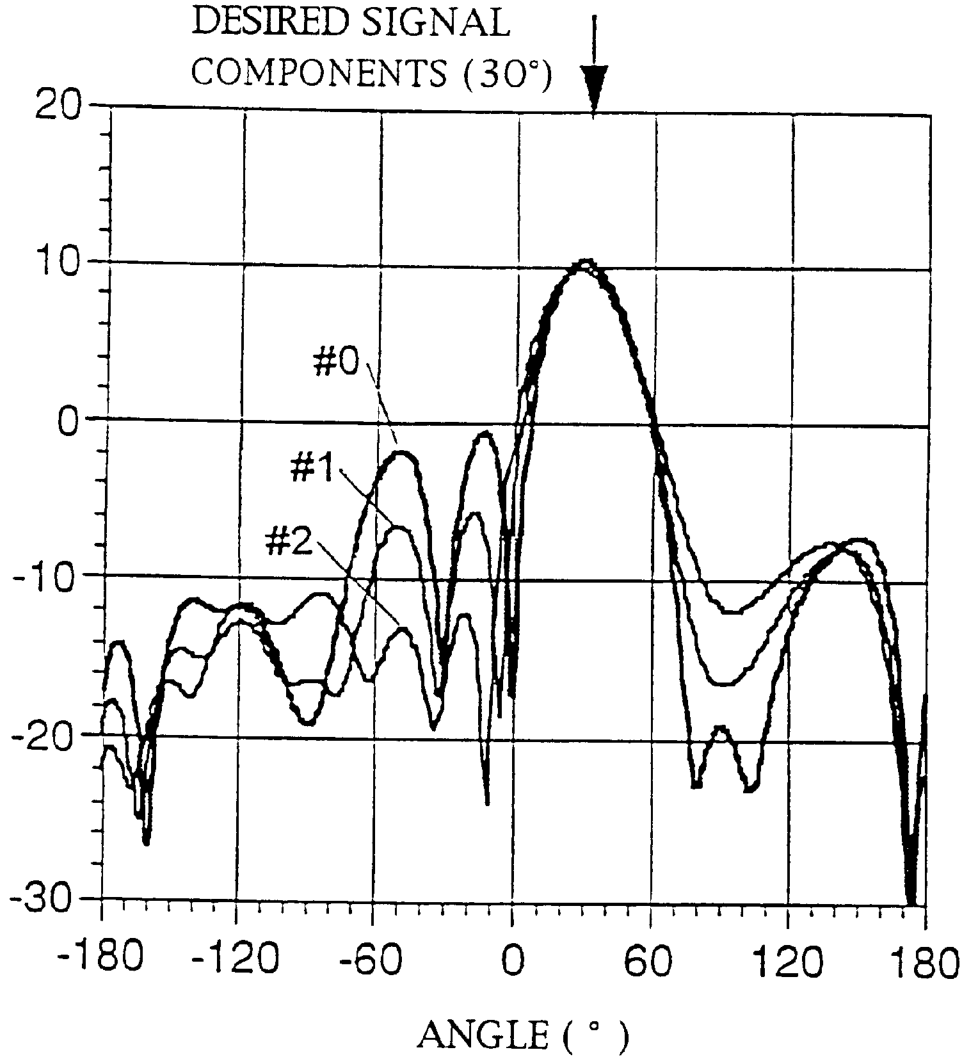
FIG. 10 is a diagram showing computer simulation results on variations in the subarray directional pattern by the side lobe suppression.

FIG. 10 shows computer simulation results on the subarray directional pattern when the peak of the pattern of each subarray consisting of four antenna elements is in the direction of 30°; the curves #0, #1 and #2 indicate the directional patterns in the cases where the signals are combined by the high-frequency signal combiner $22_{12}$ in ratios of 1:1:1:1, 0.75:1:1:0.75 and 0.5:1:1:0.5, respectively. As is evident from FIG. 10, the side lobes become smaller with a decrease in the combining ratio of the antenna outputs corresponding to the both outer ends of the subarray. Thus, it is possible to suppress the grating lobes of the combined directional pattern 19 of the whole array antenna that are generated in the side lobe areas of the subarray directional pattern.

Figure 11:
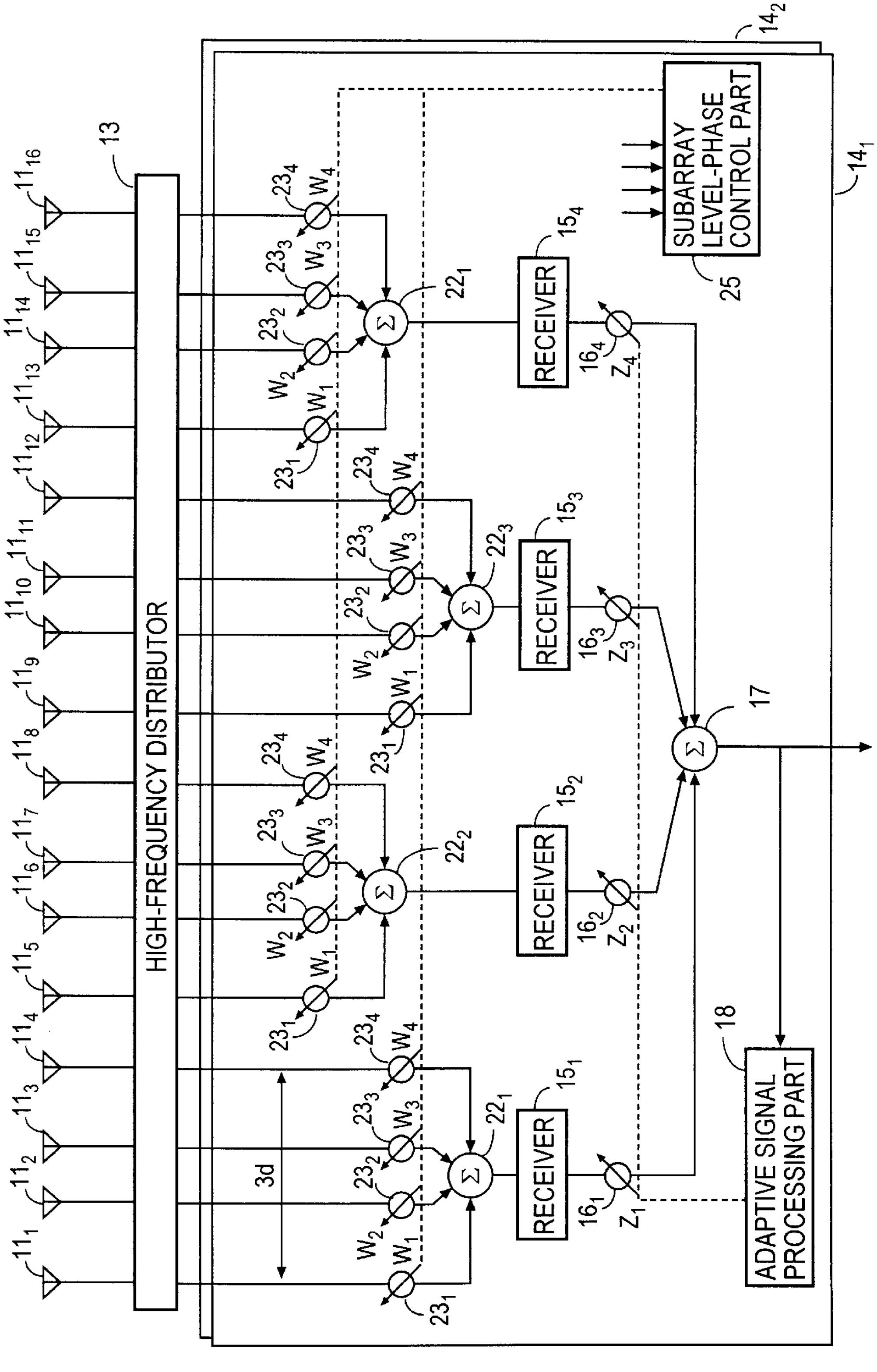
FIG. 11 is a diagram illustrating an embodiment which suppresses the side lobes by spacing the antenna elements at different intervals.

While the side lobes can be suppressed low by controlling the combining ratio of the subarray received signals, they can also be suppressed by controlling the density of arrangement of the antenna elements of each subarray. That is, by spacing the both outer antenna elements of each subarray at longer intervals than the inner antenna elements, the received signal power from the both outer antenna elements of the subarray can be made smaller than the received signal power from the inner antenna elements—this produces the same effect as is obtainable by controlling the combining ratio in the high-frequency signal combiners $22_1$ to $22_L$. FIG. 11 illustrates an embodiment in which the side lobes are suppressed by changing the antenna element spacing in the subarray. This example shows the case of spacing the two middle antenna elements of each subarray in the FIG. 6 embodiment at shorter intervals than d, thereby spacing them apart from the outer antenna elements on both sides thereof at longer intervals than d. In this instance, the width of the subarray is 3d as in the case of FIG. 6. In this embodiment, the input received signals are combined by the high-frequency signal combiners $22_1$ to $22_L$ without changing their power ratio.

As described above, by spacing the two outermost antenna elements of each subarray at longer intervals than the inner antenna elements, the power of the received signals from the two outer antenna elements can be made smaller than the power of the received signals from the inner antenna elements, so that the side lobes of the subarray directional pattern can be suppressed. That is, in the basic embodiment of the present invention shown in FIG. 6, the side lobes of the subarray directional pattern can be further suppressed by ultimately making the received signal power from the two outermost antenna elements of each subarray smaller than the received signal power from the inner antenna elements through the use of the method described above in respect of FIG. 6 or 11. Of course, it is apparent that the control of the power combining ratio in the high-frequency signal combiner, described previously with reference to FIG. 6, and the adjustment of the antenna element spacing of the subarray, described above in connection with FIG. 11, may be used in combination. Hence, in the following description of other embodiments of the invention intended to suppress the side lobes, the antenna elements of the subarray are assumed to be spaced at equal intervals unless specified, and the operation for suppressing the side lobes may be carried out by the high-frequency signal combiners $22_1$ to $22_4$, or by adjusting the antenna element spacing without changing the combining ratio in the high-frequency signal combiners, or by a combination of the two methods.

Incidentally, as the side lobes of the subarray directional pattern are suppressed as depicted in FIGS. 9 and 10, the main lobe of the subarray directional pattern becomes wider, sometimes resulting in the grating lobes entering the main lobe of the subarray directional pattern as shown in FIG. 9. It is desired to implement the subarray which not only suppresses the side lobes but also holds the width of the main lobe constant. These requirements could be met by reducing the width of the main lobe or increasing the grating lobe spacing in accordance with an increase in the width of the main lobe. The former method can be implemented by reducing the center-to-center spacing between adjacent subarrays, and the latter method by increasing the number of antenna elements of each subarray.

A description will be given first of embodiments in which the center-to-center spacing between adjacent subarrays is reduced to thereby suppress the spreading of the main lobe of each subarray that accompanies the suppression of side lobes. While in the following embodiments the total number M of antenna elements of the array antenna and the number of elements of each subarray are specified, the present invention is not limited specifically to them.

Figure 12:
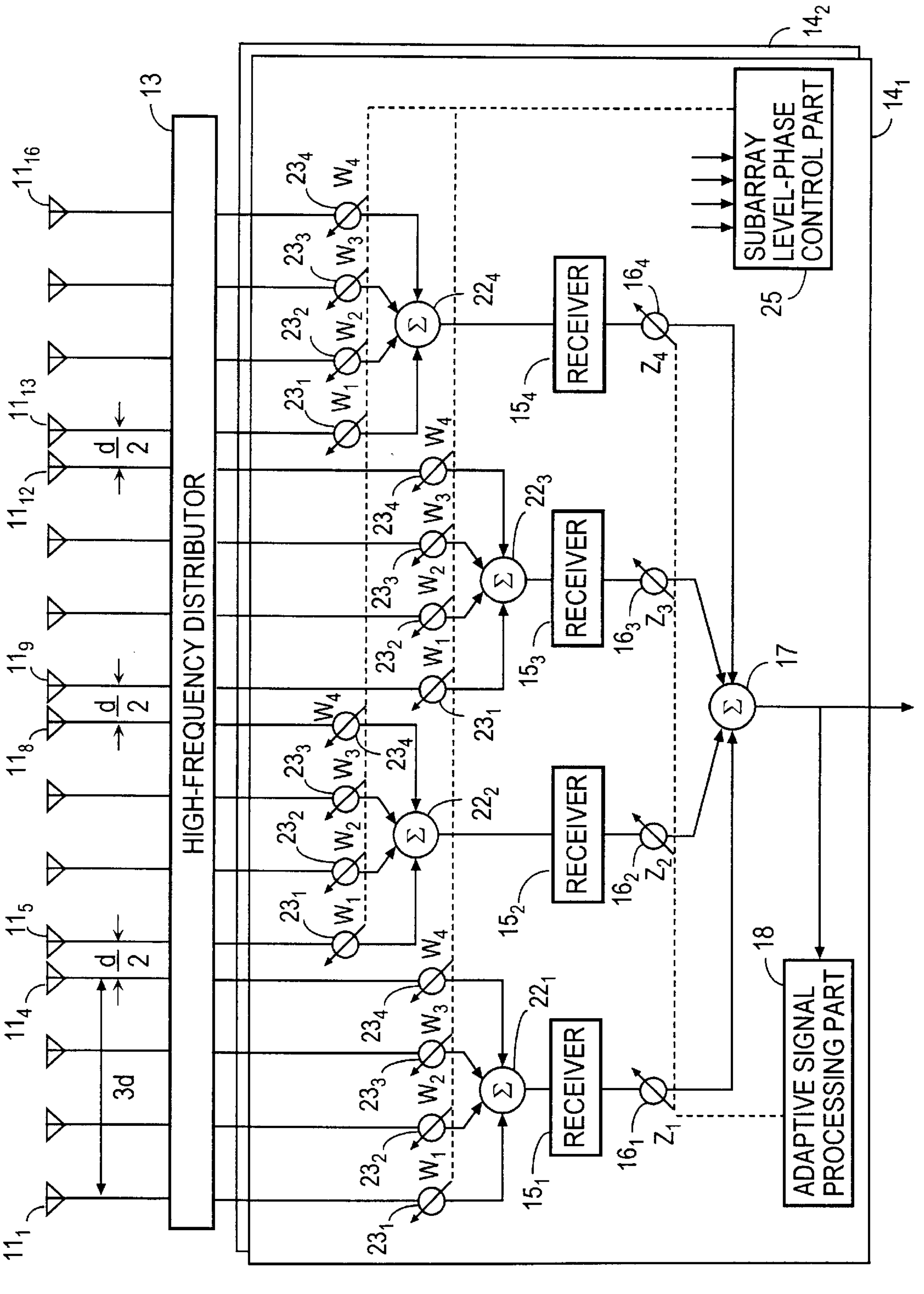
FIG. 12 is a block diagram illustrating an embodiment in which the spacing between adjacent subarrays is reduced to d/2.
Figure 13:
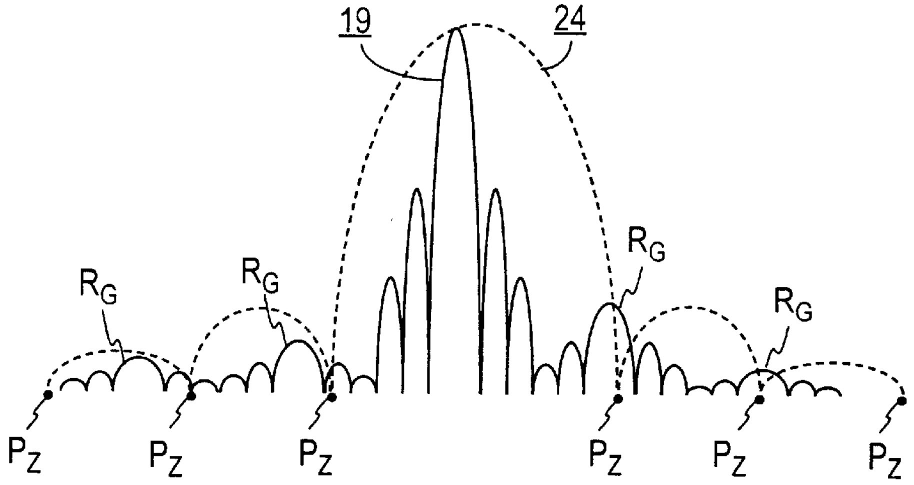
FIG. 13 is a conceptual diagram depicting the subarray directional pattern and the combined directional pattern for explaining the effect produced by the FIG. 12 embodiment.

In the embodiment of FIG. 12, the total number M of elements of the antenna array is 16 and the number of antenna elements of each subarray is 4. In contradistinction to the embodiments of FIGS. 6 and 11, the width of each subarray is assumed to be 3d. As is the case with the aforementioned embodiments, the high-frequency received signals from the antenna elements of each subarray are fed via the high-frequency level-phase regulators $23_1$ to $23_4$ to the high-frequency signal combiner $22_j$ (j=1, . . . , 4), wherein they are combined. Let it be assumed that the side lobes of each subarray directional pattern are suppressed by making the received signal power from the two outermost antenna elements of the subarray smaller than the received signal power from the inner antenna elements at the time of combining the received signals by the high-frequency signal combiner $22_j$, or by selecting the spacing between the two middle antenna elements of each subarray to be shorter than the spacing between the outer antenna elements (the suppression of side lobes). Further, in this embodiment, the spacing between the adjoining outermost antenna elements of adjacent subarrays, that is, the spaces between fourth and fifth antenna elements $11_4$ and $11_5$, between eighth and ninth antenna elements $11_8$ and $11_9$, and between twelfth and thirteenth antenna elements $11_2$ and $11_3$ are made smaller than d, in this example, d/2, whereby the center-to-center spacing between adjacent subarrays is made 3.5d, smaller than 4d in the cases of FIGS. 6 and 11. This embodiment is identical in construction with the FIG. 6 embodiment except the above. By reducing the center-to-center spacing between adjacent subarrays as mentioned above, the spreading of the main lobe of the subarray directional pattern can be suppressed as conceptually depicted in FIG. 13, by which it is possible to prevent the grating lobes from entering the main lobe due to the suppression of side lobes.

Figure 14:
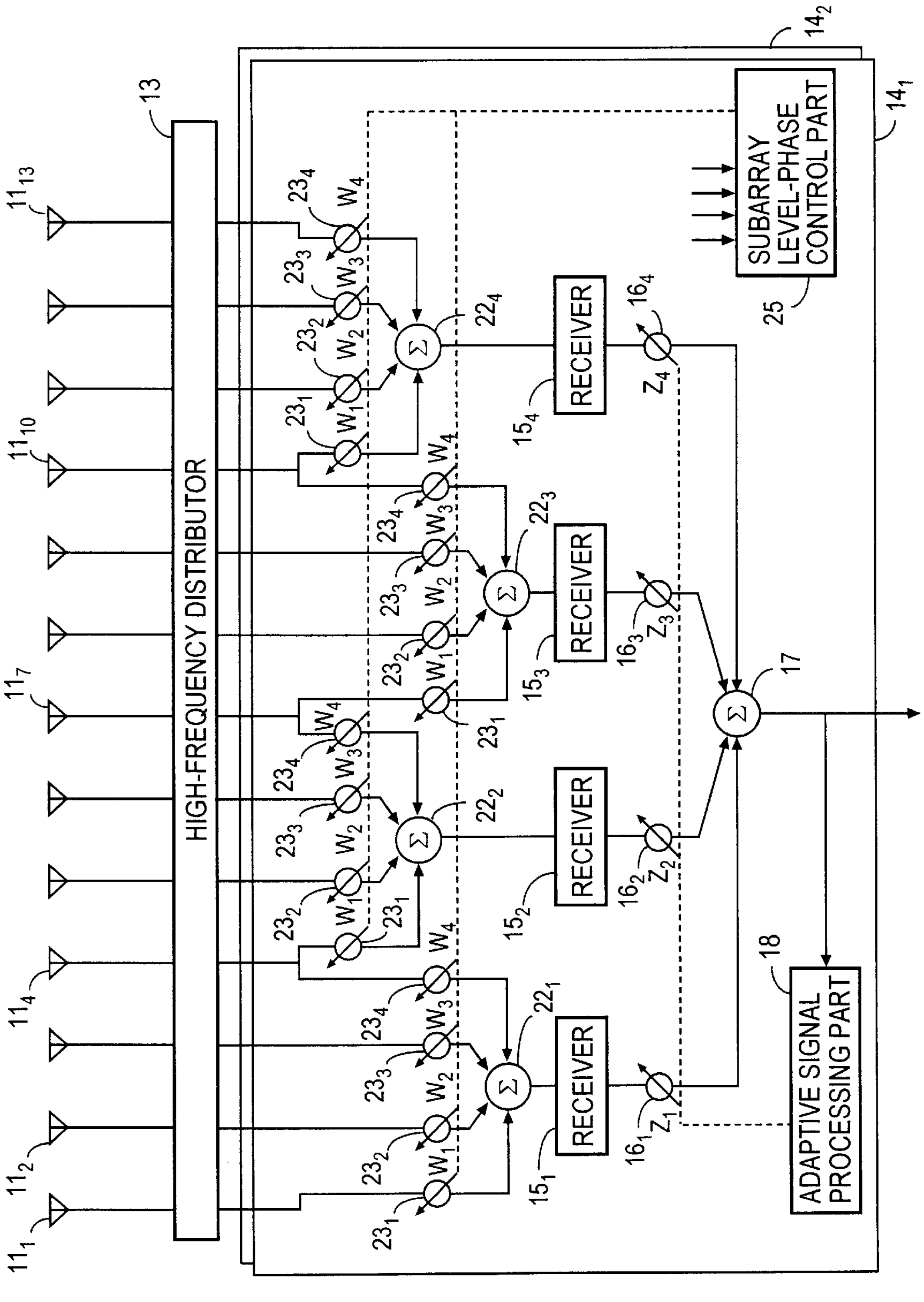
FIG. 14 is a block diagram illustrating an embodiment in which one antenna element is shared by adjacent subarrays.

In the embodiment of FIG. 14, the spacing between the adjoining outermost antenna elements of adjacent subarrays is zero. That is, the center-to-center spacing 3d between the adjacent subarrays is equal to the subarray width 3d. In this case, the outermost antenna elements of the adjoining subarrays are made integral (common to them), with the result that the number of antenna elements of the whole array antenna is reduced to 13. The received power from each of the antenna elements $11_4$, $11_7$ and $11_{10}$ shared by the adjoining subarrays is divided into two equal portions, which are fed to the fourth and first high-frequency level-phase regulators $23_4$ and $23_1$ of the adjacent subarrays, respectively. The side lobes may be suppressed using either of the two aforementioned methods. In this embodiment, too, it is possible to prevent the spreading of the main lobe of the subarray due to the suppression of the side lobes and hence prevent the grating lobes from entering the main lobe.

Figure 15:
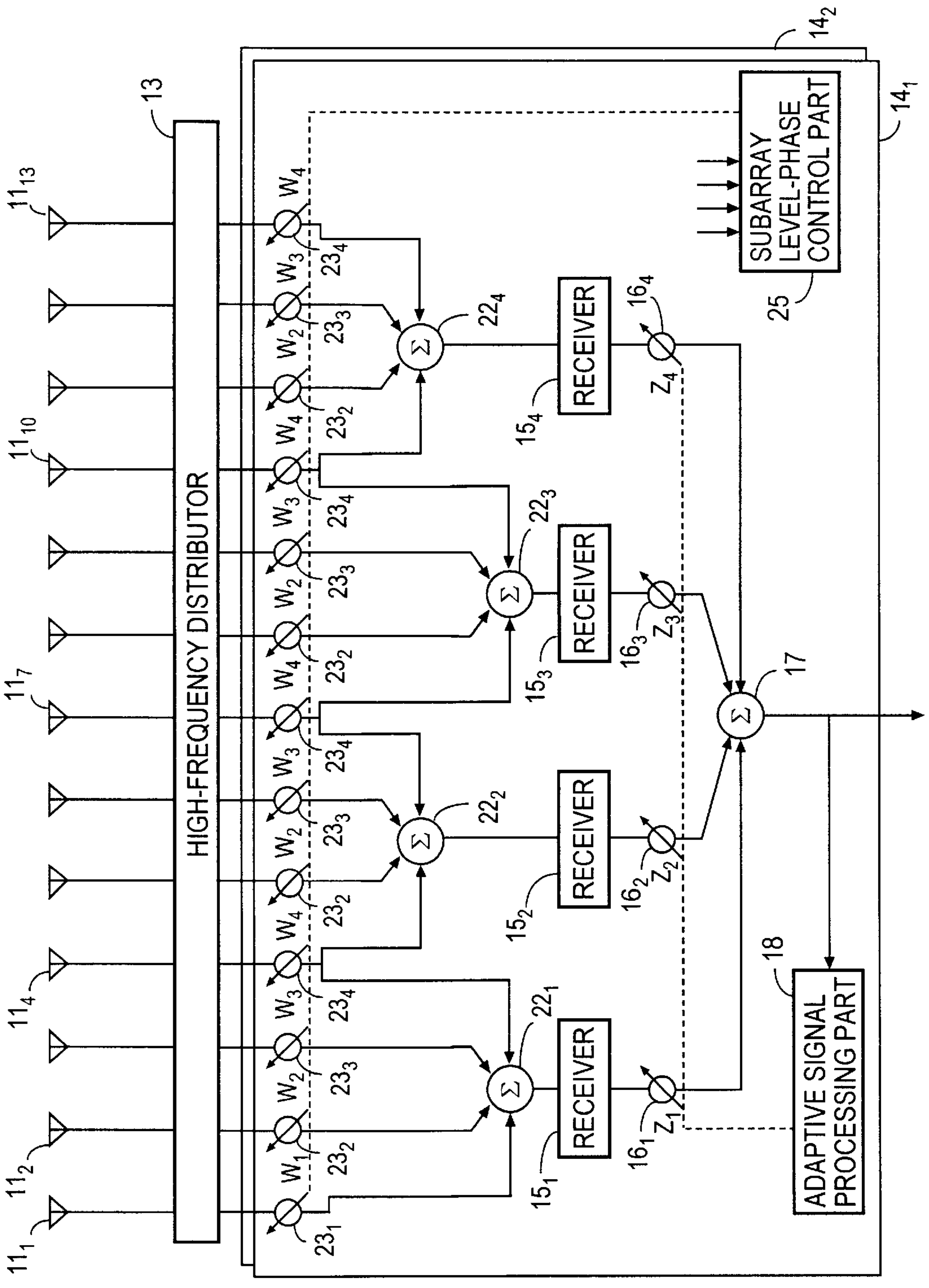
FIG. 15 is a block diagram illustrating an embodiment in which one antenna element and a level-phase regulator connected thereto are shared by adjacent subarrays.

In the embodiment of FIG. 15, the two high-frequency level-phase regulators $\mathbf{23}_4$ and $\mathbf{23}_1$, which are connected to the output of each of the antenna elements $\mathbf{11}_4$, $\mathbf{11}_7$ and $\mathbf{11}_{10}$ shared by the adjoining subarrays in the FIG. 14 embodiment, are also shared by one high-frequency level-phase regulator 23. Accordingly, the output from each high-frequency level-phase regulator 23 is equally distributed to adjacent subarrays and fed to the individual high-frequency signal combiner $\mathbf{22}_{j+1}$ (j=1,2,3). The side lobes of the subarray directional pattern may be suppressed by either of the aforementioned methods.

Figure 16:
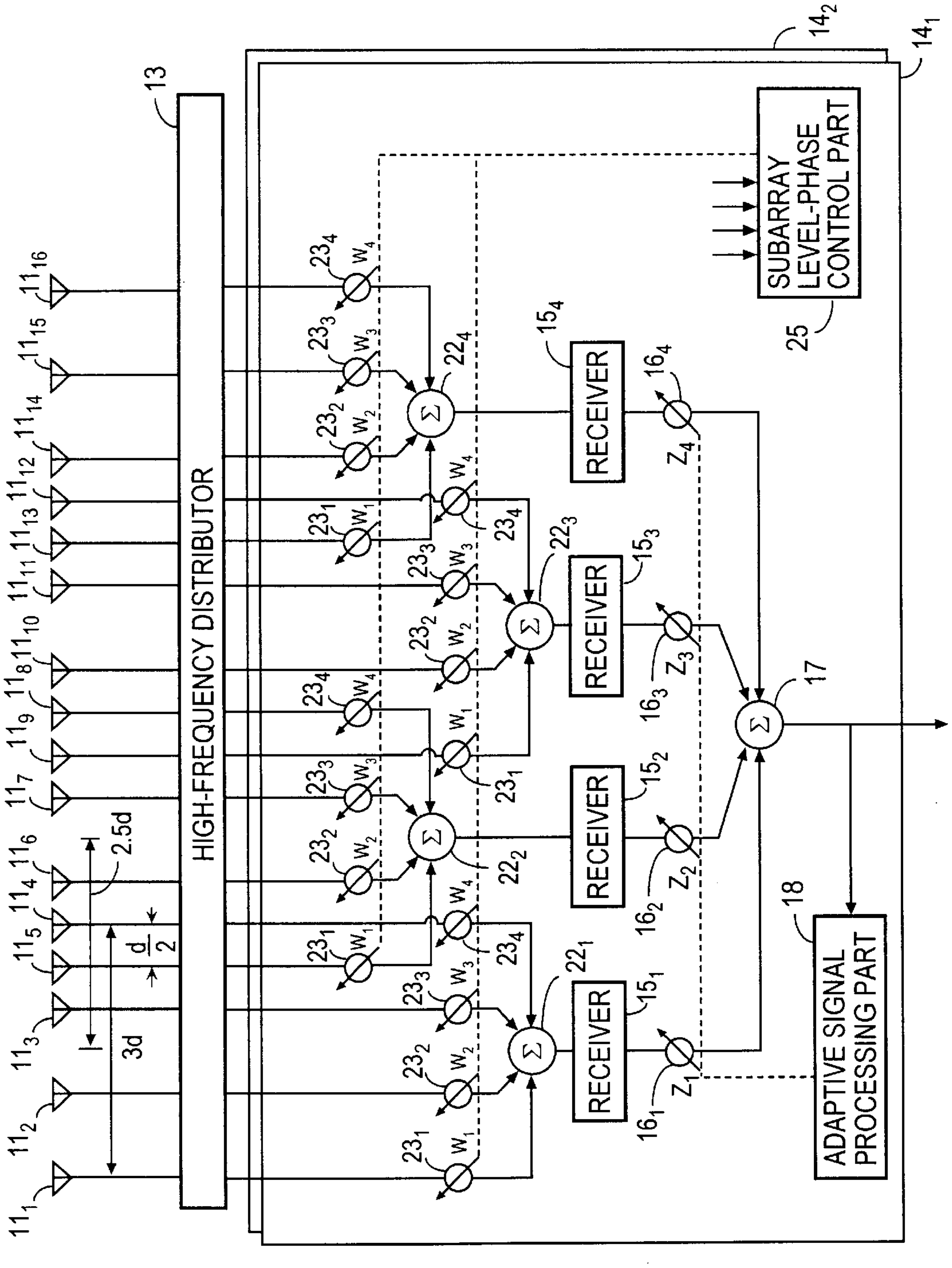
FIG. 16 is a block diagram illustrating an embodiment in which adjacent subarrays are formed to overlap by d/2.

In the embodiment of FIG. 16, the center-to-center spacing between adjacent subarrays in the FIG. 12 embodiment is further reduced down to a value smaller than the subarray width 3d. In this example, the centers of the adjoining subarrays are located closer to each other than in the FIG. 12 embodiment by d, and hence the center-to-center spacing between the subarrays is 2.5d, with the result that the adjacent subarrays overlap by d/2. That is, the adjacent subarrays overlap so that the fourth antenna elements $\mathbf{11}_4$, $\mathbf{11}_8$ and $\mathbf{11}_{12}$ of one of two adjoining subarrays are placed intermediate between the first antenna elements $\mathbf{11}_5$, $\mathbf{11}_9$ and $\mathbf{11}_{13}$ and second antenna elements $\mathbf{11}_6$, $\mathbf{11}_{10}$ and $\mathbf{11}_{14}$ of the other subarray, respectively.

Figure 17:
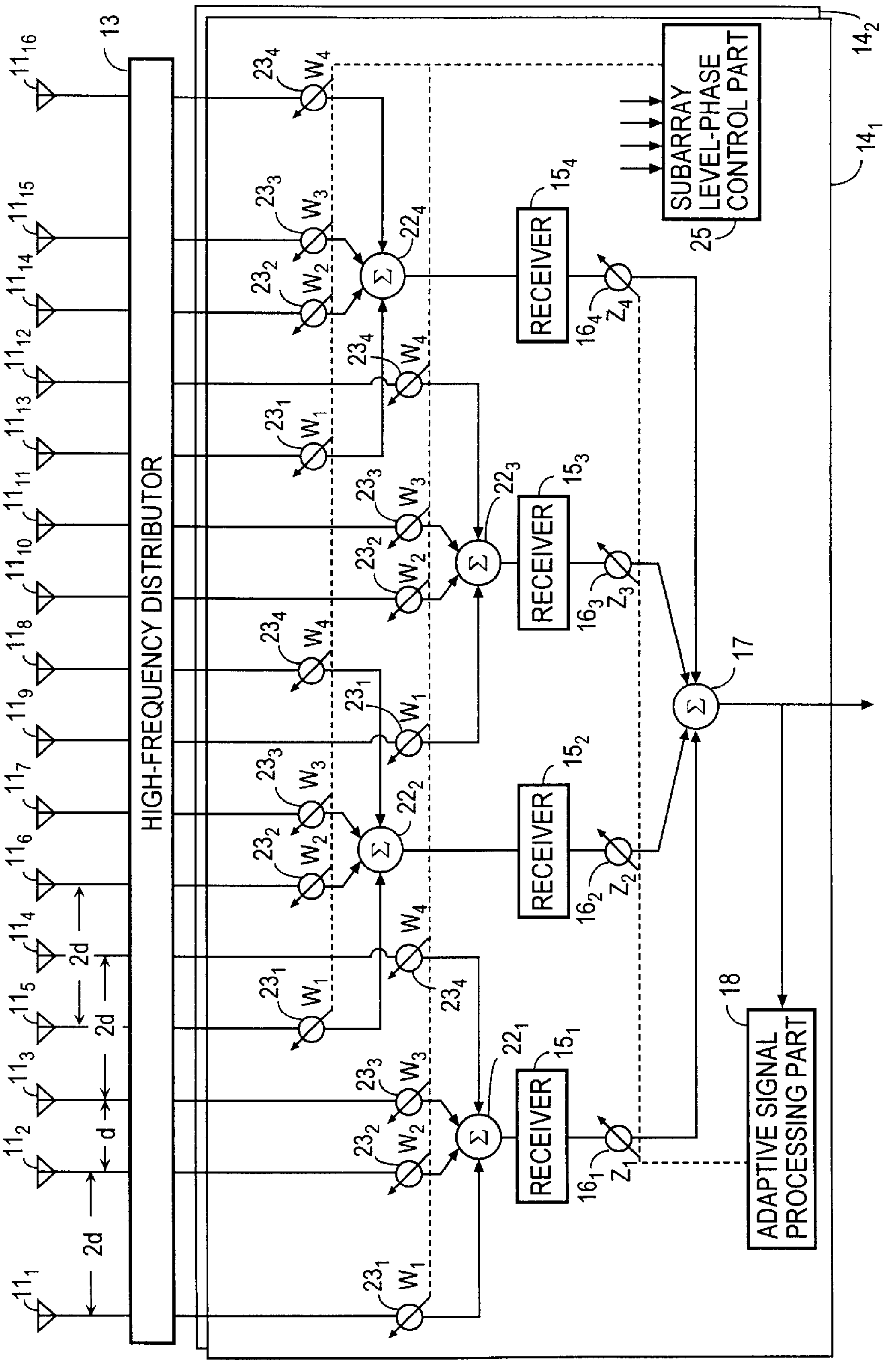
FIG. 17 is a block diagram illustrating an embodiment in which each outermost antenna element spacing of each subarray is 2d and adjacent subarrays overlap by d.

In the embodiment of FIG. 17, adjacent subarrays are disposed in overlapping relation with each other as is the case with the FIG. 16 embodiment, but this structure causes an increase in the interference between the adjoining antenna elements in the d/2 overlapping portions of adjacent subarrays; to avoid this, the spacing between the first and second antenna elements and the spacing between the third and fourth antenna elements of each subarray are both increased to 2d so that the antenna elements in the overlapping portions of the adjoining subarrays are spaced the same distance d apart. As a result, the subarray width is 5d and the center-to-center spacing between adjacent subarrays is 4d. In this embodiment, since the antenna element spacing in the outer portion of each subarray is selected to be 2d which is larger than the spacing d between the inner antenna elements, the side lobes of the subarray directional pattern are suppressed.

Figure 18:
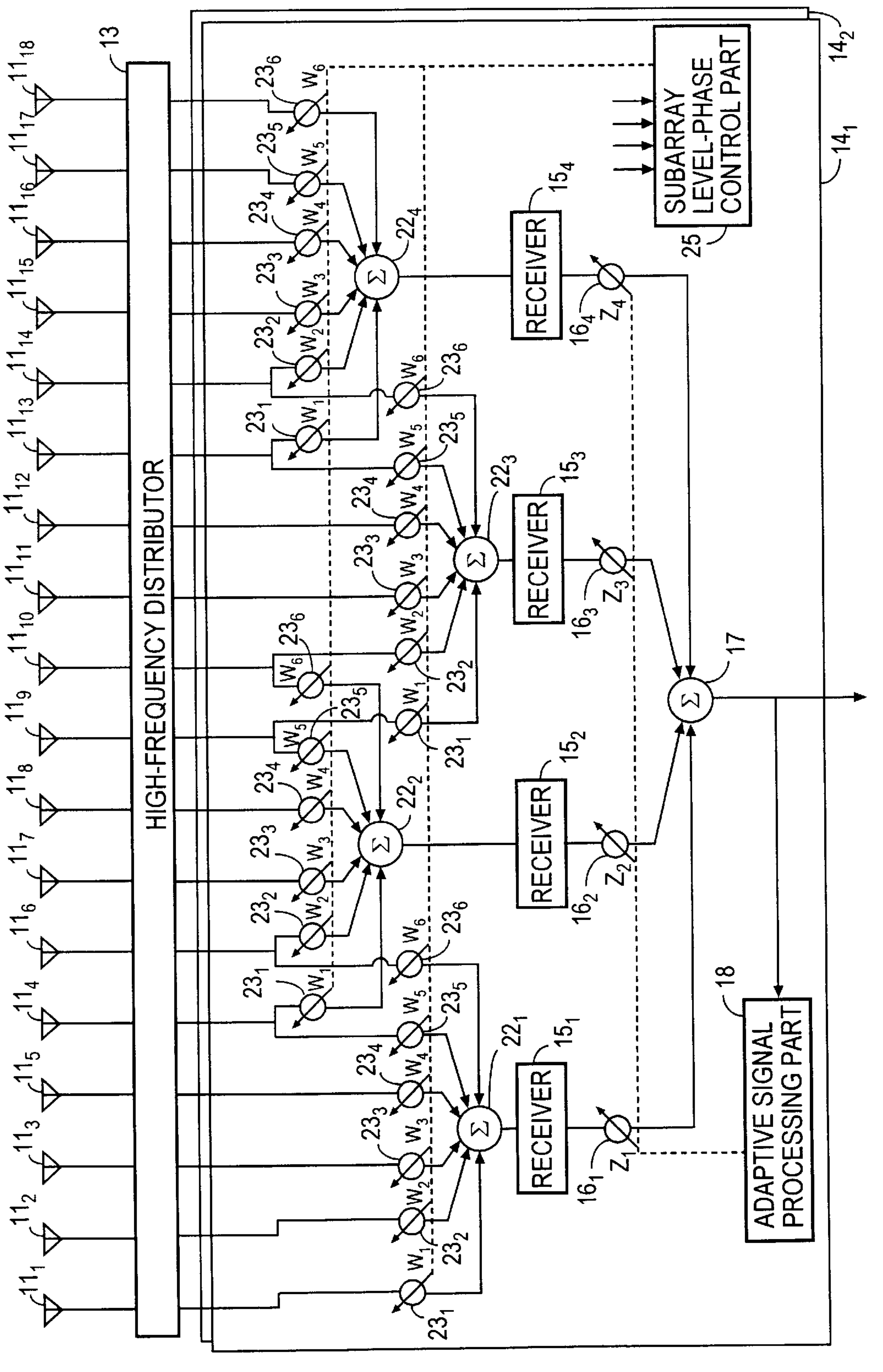
FIG. 18 is a block diagram illustrating an embodiment in which two antenna elements are shared by adjacent subarrays.

In the embodiment of FIG. 18, the center-to-center spacing between adjacent subarrays is 4d as in the case of the FIG. 6 embodiment, but the number of antenna elements of each subarray is larger than in the above-described embodiments, six antenna elements in this example, so that the grating lobes of the combined directional pattern develop at longer intervals and are thereby prevented from entering the main lobe of the subarray spread by the suppression of the side lobes. In this embodiment, since two adjoining antenna elements of adjacent subarrays are used in common thereto, the total number M of antenna elements of the array antenna is 18, and they are spaced the same distance d apart. The received power of each shared antenna element ($\mathbf{11}_5$, for instance) is distributed equally or in a certain ratio to adjacent subarray and fed to the high-frequency level-phase regulators, for example, ($\mathbf{23}_1$ and $\mathbf{23}_5$) of adjacent subarrays, respectively. The outputs of the respective high-frequency level-phase regulators $\mathbf{23}_1$ to $\mathbf{23}_5$ of each subarray are fed to the high-frequency signal combiner $\mathbf{22}_j$. This embodiment implements great overlapping of adjacent subarrays by using two antenna elements in common thereto at their overlapping portion. The suppression of side lobes is carried out by combining the received power of the two middle antenna elements and the received power of the outer antenna elements by the high-frequency signal combiner $\mathbf{22}_j$ in combining ratios decreasing with distance from the center of each subarray, or by decreasing the spacing between the inner antenna elements as compared with the spacing between the outer antenna elements.

Figure 19:
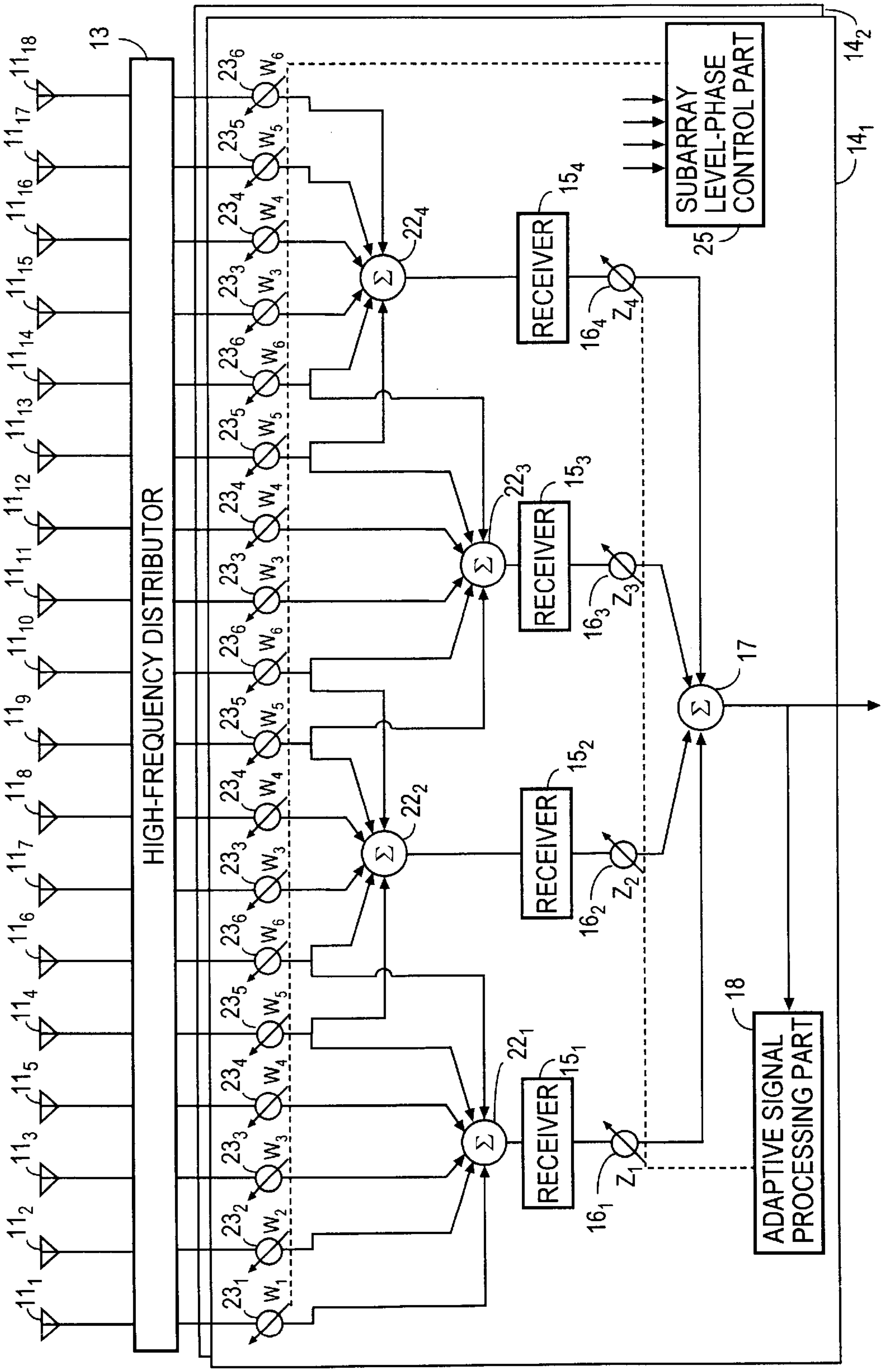
FIG. 19 is a block diagram illustrating an embodiment in which two antenna elements and level-phase regulators connected thereto are shared by adjacent subarrays.

In FIG. 19, as is the case with the FIG. 18 embodiment, the number of antenna elements of each subarray is six and two antenna elements are used in common to adjacent subarrays, but in this embodiment two high-frequency level-phase regulators, which are supplied with high-frequency received power from the two shared antenna elements are also used in common, and the output of each shared high-frequency level-phase regulator is equally distributed to the adjacent subarrays. The method for suppressing the side lobes in each subarray is the same as in the case of the FIG. 19 embodiment.

While the above the present invention has been described as being applied to multichannel receivers, the invention also produces its effect when employed in a one-channel receiver.

Figure 20:
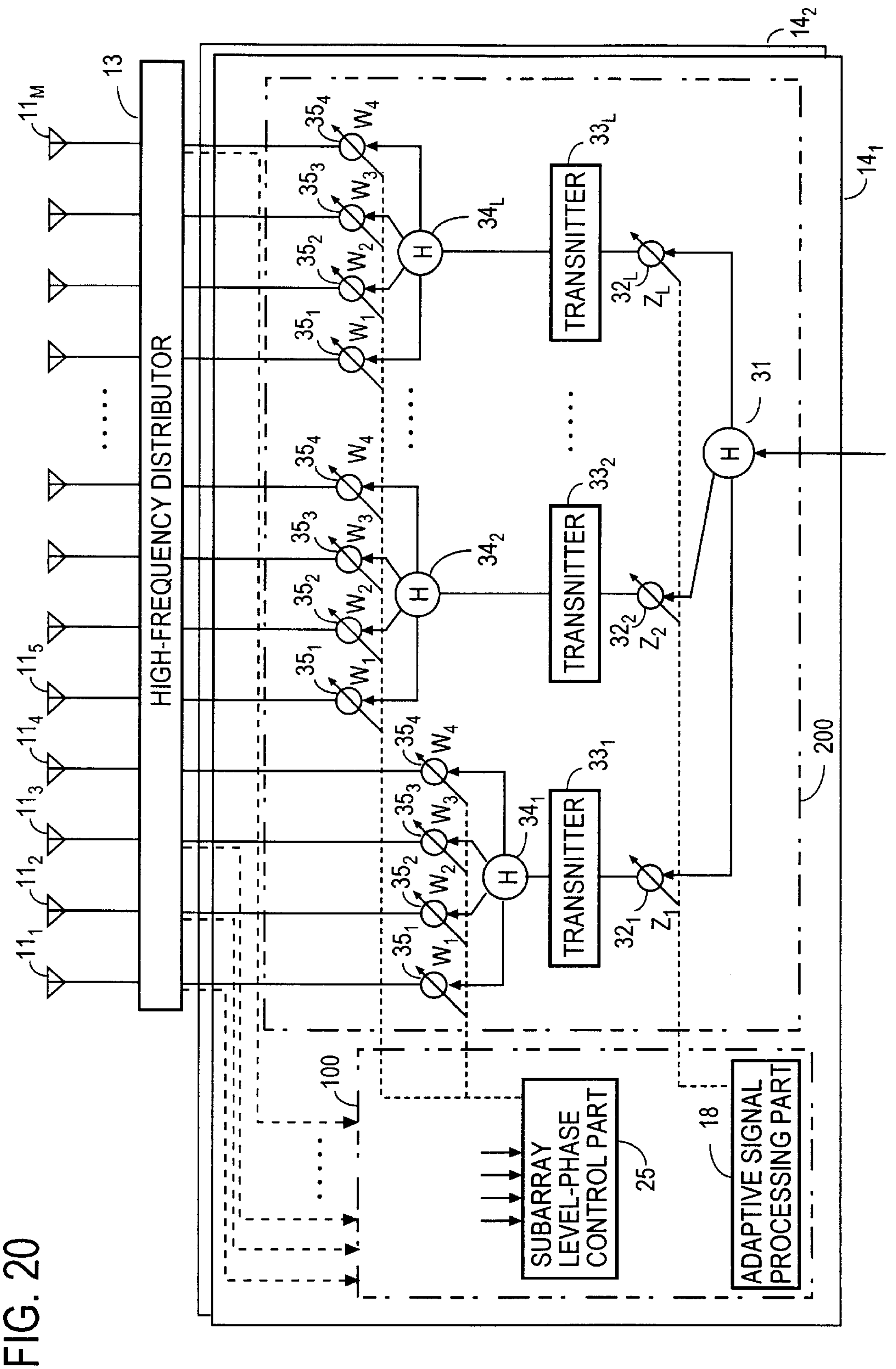
FIG. 20 is a block diagram illustrating an embodiment in which the present invention is applied to a transmitting part as well.

The present invention is applicable to a transmitter as well. An embodiment is depicted in FIG. 20. In the FIG. 20 embodiment each channel is formed by a receiving part 100 and a transmitting part 200. The receiving part 100 is the same as shown in the channel $\mathbf{14}_1$ in the FIG. 6 embodiment. In this instance, the transmitting part 200 comprises: a baseband hybrid 31 provided corresponding to the baseband signal combiner 17 in FIG. 6, whereby the input baseband signal to be transmitted is distributed to L; baseband level-phase regulators $\mathbf{32}_1$ to $\mathbf{32}_L$ provided corresponding to the baseband level-phase regulators 161 to 16L; transmitters $\mathbf{33}_1$ to $\mathbf{33}_L$ provided corresponding to the receivers $\mathbf{15}_1$ to $\mathbf{15}_L$; high-frequency hybrids $\mathbf{34}_1$ to $\mathbf{34}_L$ provided corresponding to the high-frequency signal combiners $\mathbf{22}_1$ to $\mathbf{22}_L$, for distributing high-frequency transmitting signals; and high-frequency level-phase regulators $\mathbf{35}_1$ to $\mathbf{35}_4$ provided corresponding to the high-frequency level-phase regulators $\mathbf{23}_1$ to $\mathbf{23}_4$. The high-frequency transmitting signals from the high-frequency level-phase regulators $\mathbf{35}_1$ to $\mathbf{35}_4$ are applied to the high-frequency distributor 13, from which they are sent to the corresponding antenna elements of the corresponding subarray.

When the mobile station and the base station communicate for a short period of time, uplink and downlink channels can be regarded as substantially the same. Accordingly, the subarray directivity and the combined directivity of the whole array antenna set by the base station for reception can be used intact for transmission. Then, as shown in FIG. 20, the baseband coefficients $Z_1$ to $Z_L$ generated in the adaptive signal processing part 18 of the receiving part 100 are set intact in the baeband level-phase regulators $\mathbf{32}_1$ to $^{32}$L of the transmitting part 200. Furthermore, the coefficients $W_1$ to $W_4$ determined in the subarray level-phase control part 25 of the receiving part 100 are set intact in the high-frequency level-phase regulators $\mathbf{35}_1$ to $\mathbf{35}_4$. Hence, it is possible to perform transmission with the same subarray directivity and combined directivity as those obtainable in the receiving part 100.

Although in FIG. 20 the receiving part 100 has been described to use the configuration shown in FIG. 6, any embodiments described above can be used. In such a case, the transmitting part needs only to be constructed corresponding to the receiving part as in the case of FIG. 20.

EFFECT OF THE INVENTION

As described above, according to the present invention, the subarray arrangement of antenna elements implements the combined directivity controllable over a wide range without involving marked increases in the number of receivers and processing circuits and in computational complexity, and permits reduction of the number of receivers used. When the present invention is applied to a multichannel receiver, a wide service area can be obtained by fixing the subarray directional pattern in a different direction for each channel part and switching between the channel parts. That is, it is possible to retain the effects (high gain and elimination of interfering signal components) based on the conventional subarray arrangement (FIG. 2) and obtain a wide service area without causing marked increases in the numbers of receivers and processing circuits and in the computational complexity.

Moreover, the present invention can also be applied to transmitters.

We claim:

1. An adaptive array antenna comprising:

a plurality of subarrays of antenna elements arranged in groups of at least two, said antenna elements each outputting a high-frequency received signal;

a high-frequency distributor for distributing each of the received signals from said antenna elements to a plurality of channels;

each of said plurality of channels including:

a plurality of high-frequency level-phase regulators for regulating the levels and phases of said high-frequency received signals distributed by said high-frequency distributor from said at least two antenna elements of each of said plurality of subarrays, thereby setting the directivity of said each subarray;

a high-frequency signal combiner for combining the regulated high-frequency received signals from said plurality of high-frequency level-phase regulators corresponding to said each subarray and for outputting the combined high-frequency signal;

a receiver for converting said combined high-frequency signal from said high-frequency signal combiner corresponding to said each subarray to a baseband signal and for outputting said baseband signal;

a baseband level-phase regulator for adaptively regulating the level and phase of said baseband signal from said receiver corresponding to said each subarray;

a baseband signal combiner for combining the regulated baseband signals from said baseband level-phase regulators corresponding to said plurality of subarrays, respectively, and for outputting the combined baseband signal; and an adaptive signal processing part whereby said baseband level-phase regulators corresponding to said plurality of subarrays, respectively, are adaptively controlled based on said combined baseband signal from said baseband signal combiner to set the combined directivity of all the antenna elements in the direction of a desired signal.

2. The adaptive array antenna as claimed in claim 1, wherein the number of antenna elements of each subarray is equal to or greater than 3, and said high-frequency signal combiner corresponding to each of said subarrays is a combiner whereby high-frequency received signals from said plurality of antenna elements of the corresponding subarray are combined at a less-than-1 ratio of the power of the high-frequency received signals from both outermost antenna elements of said corresponding subarray to the power of the high-frequency received signals from inner antenna elements of said corresponding subarray, thereby suppressing side lobes of the directional pattern of said each subarray.

3. The adaptive array antenna as claimed in claim 2, wherein the antenna elements of each of said subarrays are arranged at equal first spacing and adjoining antenna elements of adjoining subarrays are arranged at a second spacing smaller than said first spacing.

4. The adaptive array antenna as claimed in claim 3, wherein: said second spacing is 0; one antenna element is shared as adjacent antenna elements belonging to said adjoining subarrays; and the received signal power from said shared antenna element is divided into two equal portions, which are fed to said high-frequency level-phase regulators corresponding to said adjoining subarrays.

5. The adaptive array antenna as claimed in claim 3, wherein: said second spacing is 0; one antenna element is shared as adjacent antenna elements belonging to said adjoining subarrays; one high-frequency level-phase regulator is used as said high-frequency level-phase regulators corresponding to said adjacent antenna elements belonging to said adjoining subarrays; the received signal from said shared antenna element is applied to said shared high-frequency level-phase regulator; and its output received signal is equally distributed to said high-frequency signal combiners respectively corresponding to said adjoining subarrays.

6. The adaptive array of claim 2, wherein spacings of the antenna elements of said each subarray are equal and adjoining ends of subarrays overlap with each other by half the spacing of said antenna elements.

7. The adaptive array antenna as claimed in claim 2, wherein: said each subarray has at least six antenna elements; two antenna elements are shared by adjoining ones of said subarrays; and the received signals from said shared antenna elements are equally distributed to the groups to which said adjoining subarrays belong, respectively, and applied to high-frequency level-phase regulators corresponding to the respective groups.

8. The adaptive array antenna as claimed in claim 2, wherein: said each subarray has at least six antenna elements; two antenna elements are shared by adjoining ones of said subarrays; two high-frequency level-phase regulators are shared by said adjoining subarrays; received signals from said two shared antenna elements are applied to said two shared high-frequency level-phase regulators; and the output from each of said level-phase regulators is equally distributed to said high-frequency signal combiners of said adjoining subarrays.

9. The adaptive array antenna as claimed in claim 1, wherein the spacing between antenna elements at both sides of middle antenna elements of said each subarray is made larger than the spacing between said middle antenna elements, thereby suppressing side lobes of the directional pattern of said each subarray.

10. The adaptive array antenna of claim 9, wherein first spacing between the antenna elements at either end of said each subarray and their respectively adjoining inner element is twice the second spacing between the antenna elements located inwardly of either end, and adjoining ends of subarrays overlap with each other by said second spacing.

11. The adaptive array antenna as claimed in claim 9, wherein the antenna elements of said each subarray are arranged at equal first spacing and the antenna elements of the subarray adjoining said each subarray are arranged at a second spacing smaller than said first spacing.

12. The adaptive array antenna as claim in claim 11 wherein: said second spacing is 0; one antenna element is shared as adjacent antenna elements belonging to said adjoining subarrays; and the received signal power from said shared antenna element is divided into two equal portions, which are fed to said high-frequency level-phase regulators corresponding to said adjoining subarrays.

13. The adaptive array antenna as claimed in claim 11 wherein: said second spacing is 0; one antenna element is shared as adjacent antenna elements belonging to said adjoining subarrays; one high-frequency level-phase regulator is used as said high-frequency level-phase regulators corresponding to said adjacent antenna elements belonging to said adjoining subarrays; the received signal from said shared antenna element is applied to said shared high-frequency level-phase regulator; and its output received signal is equally distributed to said high-frequency signal combiners respectively corresponding to said adjoining subarrays.

14. The adaptive array antenna as claimed in claim 9 wherein: said each subarray has at least six antenna elements; two antenna elements are shared by adjoining ones of said subarrays; and the received signals from said shared antenna elements are equally distributed to the groups to which said adjoining subarrays belong, respectively, and applied to high-frequency level-phase regulators corresponding to the respective groups.

15. The adaptive array antenna as claimed in claim 9, wherein: said each subarray has at least six antenna elements; two antenna elements are shared by adjoining ones of said subarrays; two high-frequency level-phase regulators are shared by said adjoining subarrays; received signals from said two shared antenna elements are applied to said two shared high-frequency level-phase regulators; and the output from each of said level-phase regulators is equally distributed to said high-frequency signal combiners of said adjoining subarrays.

16. The adaptive array antenna as claimed in any one of claims 1, 2, 9, and 10, wherein the number of antenna elements of said each subarray is at least four and the number of said subarrays is at least two.

17. The adaptive array antenna as claimed in any one of claims 1, 2, 9, and 10, further in each channel, a subarray level-phase control part which, based on the received signals from said plurality of antenna elements of at least one subarray, determines coefficients to be set in said plurality of high-frequency level-phase regulators corresponding to said subarrays so that the peak of the directional pattern of said each subarray is in the direction of a desired signal, and sets said coefficients in said plurality of high-frequency level-phase regulators corresponding to said plurality of subarrays.

18. The adaptive array antenna as claimed in claim 17, further comprising:

a baseband hybrid for distributing a transmitting baseband signal in correspondence to the respective subarrays;

baseband transmitting level-phase regulators in which coefficients corresponding to said respective subarrays from said adaptive signal processing part are set, for regulating the levels and phases of said distributed transmitting baseband signals;

transmitters by which said transmitting baseband signals from said baseband transmitting level-phase regulators corresponding to said respective subarrays are converted to and output as high-frequency transmitting signals;

a plurality of high-frequency level-phase regulators for regulating the levels and phases of said high-frequency received signals from said plurality of antenna elements of said each subarray to thereby set the directional pattern of said each subarray;

a high-frequency hybrid by which said high-frequency transmitting signal corresponding to said each subarray is distributed corresponding to the plurality of antenna elements of said each subarray;

high-frequency transmitting level-phase regulators supplied with high-frequency level-phase coefficients of said each subarray from said subarray level-phase control part, for regulating the levels and phases of said distributed high-frequency transmitting signals in accordance with said high-frequency level-phase coefficients; and a high-frequency distributor for sending the outputs of said high-frequency transmitting level-phase regulators to the antenna elements corresponding thereto, respectively.

19. An adaptive array antenna comprising:

a plurality of subarrays of antenna elements arranged in groups of at least two, said antenna elements each outputting a high-frequency received signal;

a plurality of high-frequency level-phase regulators for regulating the levels and phases of said high-frequency received signals from said at least two antenna elements of each of said plurality of subarrays, thereby setting the directivity of said each subarray;

a high-frequency signal combiner for combining the regulated high-frequency received signals from said plurality of high-frequency level-phase regulators corresponding to said each subarray and for outputting the combined high-frequency signal;

a receiver for converting said combined high-frequency signal from said high-frequency signal combiner corresponding to said each subarray to a baseband signal and for outputting said baseband signal;

a baseband level-phase regulator for adaptively regulating the level and phase of said baseband signal from said receiver corresponding to said each subarray;

a baseband signal combiner for combining the regulated baseband signals from said baseband level-phase regulators corresponding to said plurality of subarrays, respectively, and for outputting the combined baseband signal;

an adaptive signal processing part whereby said baseband level-phase regulators corresponding to said plurality of subarrays, respectively, are adaptively controlled based on said combined baseband signal from said baseband signal combiner to set the combined directivity of all the antenna elements in the direction of a desired signal; and a subarray level-phase control part which, based on the received signals from said plurality of antenna elements of at least one subarray, determines coefficients to be set in said plurality of high-frequency level-phase regulators corresponding to said subarrays so that the peak of the directional pattern of said each subarray is in the direction of a desired signal, and sets said coefficients in said plurality of high-frequency level-phase regulators corresponding to said plurality of subarrays.

20. The adaptive array antenna as claimed in claim 19, wherein the number of antenna elements of each subarray is equal to or greater than 3, and said high-frequency signal combiner corresponding to each of said subarrays is a combiner whereby high-frequency received signals from said plurality of antenna elements of the corresponding subarray are combined at a less-than-1 ratio of the power of the high-frequency received signals from both outermost antenna elements of said corresponding subarray to the power of the high-frequency received signals from inner antenna elements of said corresponding subarray, thereby suppressing side lobes of the directional pattern of said each subarray.

21. The adaptive array antenna of claim 20, wherein spacings of the antenna elements of said each subarray are equal and adjoining ends of subarrays overlap with each other by the half the spacing of said antenna elements.

22. The adaptive array antenna as claimed in claim 19, wherein the spacing between antenna elements at both sides of middle antenna elements of said each subarray is made larger than the spacing between said middle antenna elements, thereby suppressing side lobes of the directional pattern of said each subarray.

23. The adaptive array antenna of claim 22, wherein first spacing between the antenna elements at either end of said each subarray is twice the second spacing between the antenna elements located inwardly of either end, and further wherein adjoining ends of subarrays overlap with each other by said second spacing.

24. The adaptive array antenna of claim 20 or 22, wherein the antenna elements of each of said subarrays are arranged at equal first spacing and adjoining antenna elements of adjoining subarrays are arranged at a second spacing smaller than said first spacing.

25. The adaptive array antenna of claim 20 or 22, wherein: said second spacing is 0; one antenna element is shared by adjacent antenna elements belonging to said adjoining subarrays; and the received signal power from said shared antenna element is divided into two equal portions, which are fed to said high-frequency level-phase regulators corresponding to said adjoining subarrays.

26. The adaptive array antenna of claim 20 or 22, wherein: said second spacing is 0; one antenna element is shared by adjacent antenna elements belonging to said adjoining subarrays; one high-frequency level-phase regulator is used as said high-frequency level-phase regulators corresponding to said adjacent antenna elements belonging to said adjoining subarrays; the received signal from said shared antenna element is applied to said shared high-frequency level-phase regulator; and its output received signal is equally distributed to said high-frequency signal combiners respectively corresponding to said adjoining subarrays.

27. The adaptive array of claim 20 or 22, wherein:

said each subarray has at least six antenna elements; two antenna elements are shared by adjoining ones of said subarrays; and the received signals from said shared antenna elements are equally distributed to the groups to which said adjoining subarrays belong, respectively, and applied to high-frequency level-phase regulators corresponding to the respective groups.

28. The adaptive array antenna of claim 20 or 22, wherein:

said each subarray has at least six antenna elements; two antenna elements are shared by adjoining ones of said subarrays; two high-frequency level-phase regulators are shared by said adjoining subarrays; received signals from said two shared antenna elements are applied to said two shared high-frequency level-phase regulators; and the output from each of said level-phase regulators is equally distributed to said high-frequency signal combiners of said adjoining subarrays.

29. The adaptive array antenna of claim 19, 20, 22, 21, or 23, wherein the number of antenna elements of said each subarray is at least four and the number of said subarrays is at least two.

30. The adaptive array antenna of claim 19, further comprising:

a baseband hybrid for distributing a transmitting baseband signal in correspondence to the respective subarrays;

baseband transmitting level-phase regulators in which coefficients corresponding to said respective subarrays from said adaptive signal processing part are set, for regulating the levels and phases of said distributed transmitting baseband signals;

transmitters by which said transmitting baseband signals from said baseband transmitting level-phase regulators corresponding to said respective subarrays are converted to and output as high-frequency transmitting signals;

a plurality of high-frequency level-phase regulators for regulating the levels and phases of said high-frequency received signals from said plurality of antenna elements of said each subarray to thereby set the directional pattern of said each subarray, a high-frequency hybrid by which said high-frequency transmitting signal corresponding to said each subarray is distributed corresponding to the plurality of antenna elements of said each subarray;

high-frequency transmitting level-phase regulators supplied with high-frequency level-phase coefficients of said each subarray from said subarray level-phase control part, for regulating the levels and phases of said distributed high-frequency transmitting signals in accordance with said high-frequency level-phase coefficients; and a high-frequency distributor for sending the outputs of said high-frequency transmitting level-phase regulators to the antenna elements corresponding thereto, respectively.

* * * * *

UNITED STATES PATENT AND TRADEMARK OFFICE

CERTIFICATE OF CORRECTION

PATENT NO. : 6,336,033
DATED : January 1, 2002
INVENTOR(S) : Ryo Yamaguchi et al.

It is certified that error appears in the above-identified patent and that said Letters Patent is hereby corrected as shown below:

Title page,
The assignee's name is wrongly spelled. It should read "NTT Communications Network Inc." not NTT Communication Network Inc.

Signed and Sealed this

Twenty-first Day of May, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,336,033 B1
DATED : January 1, 2002
INVENTOR(S) : Yamaguchi et al.

It is certified that error appears in the above-identified patent and that said Letters Patent is hereby corrected as shown below:

<u>Title page,</u>
Item [30], Foreign Application Priority Data, “Feb. 6, 1997” should read -- June 2, 1997 --.

Signed and Sealed this

Eleventh Day of April, 2006

JON W. DUDAS
*Director of the United States Patent and Trademark Office*